United States Patent
Wylezinski et al.

(10) Patent No.: US 10,053,037 B2
(45) Date of Patent: Aug. 21, 2018

(54) REAR IMPACT GUARD

(71) Applicant: Wabash National, L.P., Lafayette, IN (US)

(72) Inventors: Andrzej Wylezinski, Lafayette, IN (US); Brian C. Belcher, Brownsburg, IN (US)

(73) Assignee: Wabash National, L.P., Lafayette, IN (US)

( * ) Notice: Subject to any disclaimer, the term of this patent is extended or adjusted under 35 U.S.C. 154(b) by 7 days.

(21) Appl. No.: 15/384,812

(22) Filed: Dec. 20, 2016

(65) Prior Publication Data

US 2017/0101070 A1 Apr. 13, 2017

Related U.S. Application Data

(63) Continuation of application No. 14/645,095, filed on Mar. 11, 2015, now Pat. No. 9,566,923.

(60) Provisional application No. 62/039,546, filed on Aug. 20, 2014, provisional application No. 61/951,080, filed on Mar. 11, 2014.

(51) Int. Cl.
*B60R 19/02* (2006.01)
*B60R 19/24* (2006.01)
*B60R 19/56* (2006.01)

(52) U.S. Cl.
CPC ............ *B60R 19/24* (2013.01); *B60R 19/023* (2013.01); *B60R 19/56* (2013.01)

(58) Field of Classification Search
CPC ......... B60R 19/18; B60R 19/26; B60R 19/32; B60R 9/10; B60R 19/02; H05K 7/1497; H05K 7/20745; H05K 7/20836; H05K 7/20736; G06F 1/20

USPC .......................................................... 293/102
See application file for complete search history.

(56) References Cited

U.S. PATENT DOCUMENTS

| | | | | |
|---|---|---|---|---|
| 1,855,977 A | * | 4/1932 | Llobet | B60R 19/28 293/135 |
| 3,533,654 A | * | 10/1970 | Kannegieter | B60R 19/38 108/132 |
| 3,720,333 A | * | 3/1973 | Vaughn | B60R 9/06 224/402 |
| 3,871,695 A | * | 3/1975 | Koenig | B60R 19/56 293/118 |
| 3,913,963 A | * | 10/1975 | Persicke | B60R 19/56 293/15 |
| 3,923,330 A | * | 12/1975 | Viall, Sr. | B60R 19/56 180/275 |

(Continued)

FOREIGN PATENT DOCUMENTS

DE 1280695 B 10/1968
DE 9311893 1/1994
(Continued)

*Primary Examiner* — Kiran B Patel
(74) *Attorney, Agent, or Firm* — Quarles & Brady LLP

(57) ABSTRACT

A rear impact guard includes a bumper support member configured to be coupled to a rear end of a vehicle and a horizontal bumper mounted at a lower end of the bumper support member. The bumper support member includes a generally triangular prism member having a generally triangular-shaped face, a vertical member, a horizontal member, and an angled member, and wherein the vertical, horizontal, and angled members are coupled to outer edges of the triangular-shaped face.

14 Claims, 25 Drawing Sheets

(56) References Cited

U.S. PATENT DOCUMENTS

| | | | |
|---|---|---|---|
| 4,026,590 A * | 5/1977 | Holm | B60R 19/56 |
| | | | 293/118 |
| 4,105,237 A * | 8/1978 | Viall, Sr. | B60R 19/56 |
| | | | 180/275 |
| 4,359,239 A * | 11/1982 | Eggert, Jr. | B60R 19/56 |
| | | | 293/132 |
| 4,410,207 A * | 10/1983 | Scharf | B60R 19/56 |
| | | | 293/118 |
| 4,991,681 A * | 2/1991 | Paulson | B60K 31/0008 |
| | | | 180/275 |
| 5,632,518 A * | 5/1997 | Kendall | B60R 19/38 |
| | | | 293/103 |
| 5,673,953 A * | 10/1997 | Spease | B60R 19/38 |
| | | | 293/118 |
| 6,089,629 A | 7/2000 | Hope et al. | |
| 6,116,667 A | 9/2000 | Torcomian | |
| 6,176,529 B1 | 1/2001 | Kitzmiller et al. | |
| 6,176,530 B1 | 1/2001 | Gollungberg | |
| 6,183,025 B1 * | 2/2001 | Hope | B60R 19/56 |
| | | | 293/131 |
| 6,652,010 B1 | 11/2003 | Huddle et al. | |
| 6,799,783 B2 | 10/2004 | Gollungberg et al. | |
| 6,837,536 B1 | 1/2005 | Schwartz | |
| 6,962,378 B2 | 11/2005 | Leford et al. | |
| 7,086,674 B2 * | 8/2006 | Goertz | B60R 19/56 |
| | | | 293/132 |
| 7,216,904 B2 | 5/2007 | Thomas | |
| 7,399,015 B2 | 7/2008 | Patel et al. | |
| 7,527,309 B2 | 5/2009 | Smidler | |
| 7,766,403 B2 | 8/2010 | Alvarsson et al. | |
| 7,810,870 B2 | 10/2010 | Shepard et al. | |
| 7,900,983 B2 | 3/2011 | Saitou | |
| 7,950,705 B2 | 5/2011 | Saitou | |
| 7,967,349 B2 | 6/2011 | Puppini et al. | |
| 8,100,465 B2 | 1/2012 | Wylezinski | |
| 8,950,793 B2 | 2/2015 | Deighton | |
| D728,447 S | 5/2015 | Bobba | |
| 9,199,594 B2 | 12/2015 | Musale et al. | |
| 9,308,881 B2 | 4/2016 | Bobba | |
| 9,463,759 B1 | 10/2016 | Kiefer | |
| 9,771,040 B2 | 9/2017 | Miller et al. | |
| 9,783,144 B2 | 10/2017 | Miller et al. | |
| 2005/0116435 A1 | 6/2005 | Nishiura et al. | |
| 2007/0046041 A1 | 3/2007 | Thomas | |
| 2008/0073941 A1 * | 3/2008 | Wylezinski | B60P 1/445 |
| | | | 296/209 |
| 2009/0001682 A1 | 1/2009 | Yamashita et al. | |
| 2010/0202150 A1 * | 8/2010 | Adams | B60Q 1/2607 |
| | | | 362/485 |
| 2011/0291385 A1 | 12/2011 | Dorsey et al. | |
| 2015/0258951 A1 * | 9/2015 | Wylezinski | B60R 19/023 |
| | | | 293/102 |
| 2017/0050596 A1 * | 2/2017 | Miller | B60R 19/24 |
| 2017/0072886 A1 * | 3/2017 | Wylezinski | B60R 19/56 |

FOREIGN PATENT DOCUMENTS

| | | |
|---|---|---|
| DE | 19643049 A1 | 4/1998 |
| DE | 102007001111 A1 | 7/2008 |
| EP | 1600335 A2 | 11/2005 |
| EP | 2845772 A1 | 3/2015 |
| WO | 2012087101 A3 | 6/2012 |
| WO | 2013002010 A1 | 1/2013 |

* cited by examiner

REAR IMPACT GUARD

CROSS REFERENCE TO RELATED APPLICATIONS

The present utility patent application is a continuation of U.S. patent application Ser. No. 14/645,095, filed on Mar. 11, 2015, and entitled "Rear Impact Guard", which claims the benefit of U.S. Provisional Application No. 62/039,456, filed on Aug. 20, 2014, and entitled "Rear Impact Guard" and U.S. Provisional Application No. 61/951,080, filed on Mar. 11, 2014, and entitled "Rear Impact Guard." The entire disclosures thereof are incorporated by reference herein in their entireties.

FIELD OF THE DISCLOSURE

The present disclosure relates generally to semi-trailers, such as van-type trailers, for example. In particular, the present disclosure relates to a rear impact guard for a semi-trailer and other vehicles.

BACKGROUND

The rear impact guard of a trailer, semi-trailer, and/or flatbed trailer is generally provided to help prevent other vehicles in a rear-impact collision with such a trailer from traveling beyond the rear extremity of the trailer and into an area beneath the floor assembly of the trailer. Rear impact guards may also operate to absorb the energy of a rear impact from another vehicle. Rear impact guards typically include a horizontal member suspended from two struts attached to the bottom side of the trailer rear end wall.

SUMMARY

The present invention may comprise one or more of the features recited in the attached claims, and/or one or more of the following features and combinations thereof.

According to one aspect of the present disclosure, a rear impact guard configured to be coupled to a rear end of a vehicle includes first and second bumper support members, the first and second bumper support members being identical to one another, the first bumper support member configured to be coupled to a rear end of a vehicle to a first side of a longitudinal axis of the vehicle, and the second bumper support member configured to be coupled to the rear end of the vehicle to a second side of the longitudinal axis of the vehicle. The rear impact guard further includes third and fourth bumper support members configured to be coupled to the rear end of the vehicle, the third and fourth bumper support members being identical and different from the first and second bumper support members, the third bumper support member being spaced outwardly from the first bumper support member, and the fourth bumper support member being spaced outwardly from the second bumper support member. A horizontal bumper is mounted at a lower end of each of the first, second, third, and fourth bumper support members. Each of the third and fourth bumper support members includes a generally triangular prism member.

According to another aspect of the present disclosure, a rear impact guard configured to be coupled to a rear end of a vehicle includes a bumper support member configured to be coupled to a rear end of a vehicle and a horizontal bumper mounted at a lower end of the bumper support member, wherein the bumper support member includes a generally triangular prism member having a generally triangular-shaped face, a vertical member, a horizontal member, and an angled member, and wherein the vertical, horizontal, and angled members are coupled to outer edges of the triangular-shaped face.

According to yet another aspect of the present disclosure, a rear impact guard configured to be coupled to a rear end of a vehicle includes first and second bumper support members, the first bumper support member configured to be coupled to a rear end of a vehicle to a first side of a longitudinal axis of the vehicle and the second bumper support member configured to be coupled to the rear end of the vehicle to a second side of the longitudinal axis of the vehicle. The rear impact guard further includes third and fourth bumper support members configured to be coupled to the rear end of the vehicle, the third and fourth bumper support members being identical and different from the first and second bumper support members, the third bumper support member being spaced outwardly from the first bumper support member, and the fourth bumper support member being spaced outwardly from the second bumper support member. First and second support bases are configured to be coupled to the rear end of the vehicle and are configured to be positioned below a floor assembly of the vehicle, wherein the first and second support bases are spaced from one another along a width of the vehicle and associated with the third and fourth bumper support members. A horizontal bumper is mounted at a lower end of each of the first, second, third, and fourth bumper support members.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1A:
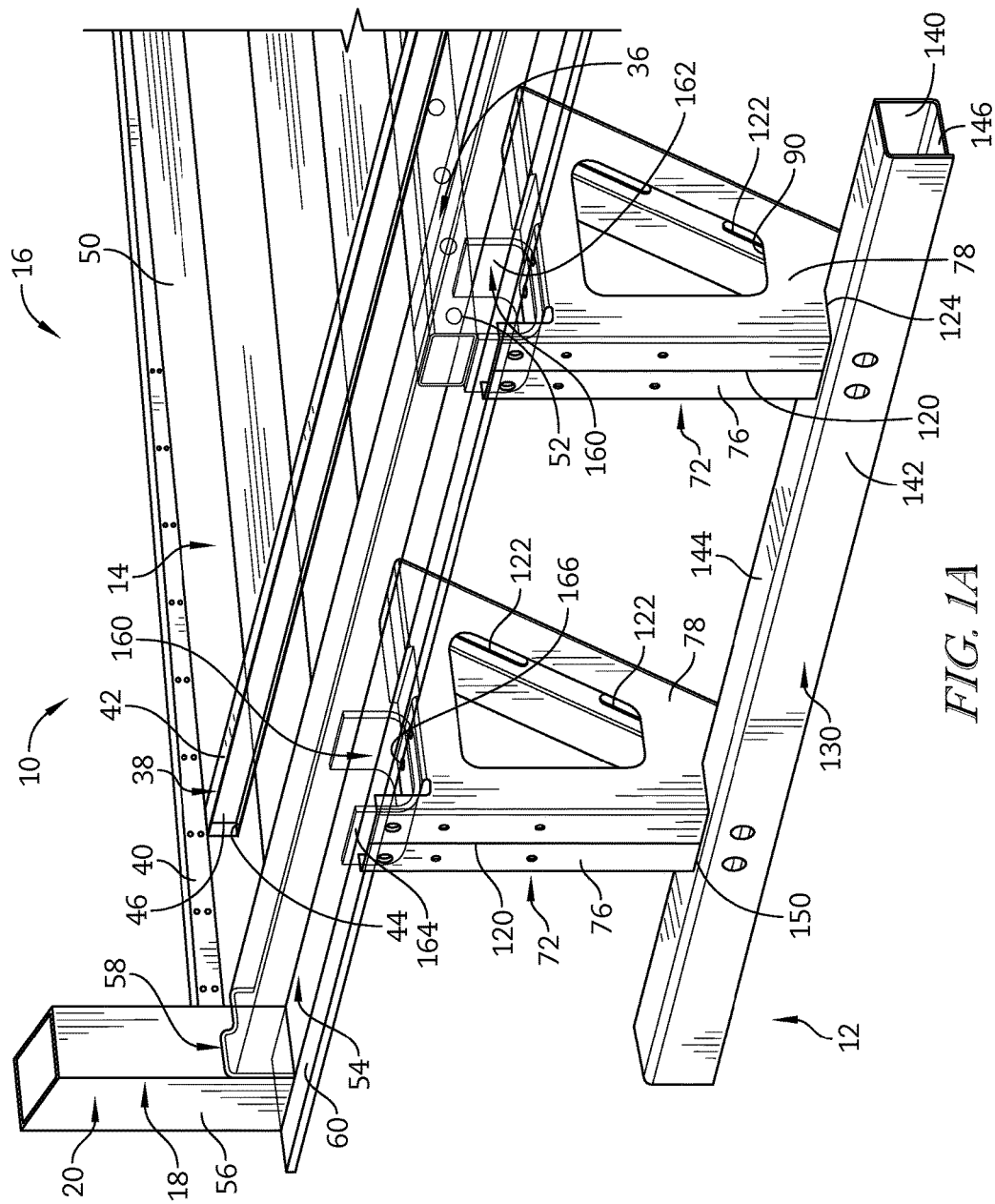
FIG. 1A is a perspective view of a rear impact guard of the present disclosure showing the rear impact guard including two vertical support members coupled to the underside of a rear door frame and floor assembly of a trailer.
Figure 34:
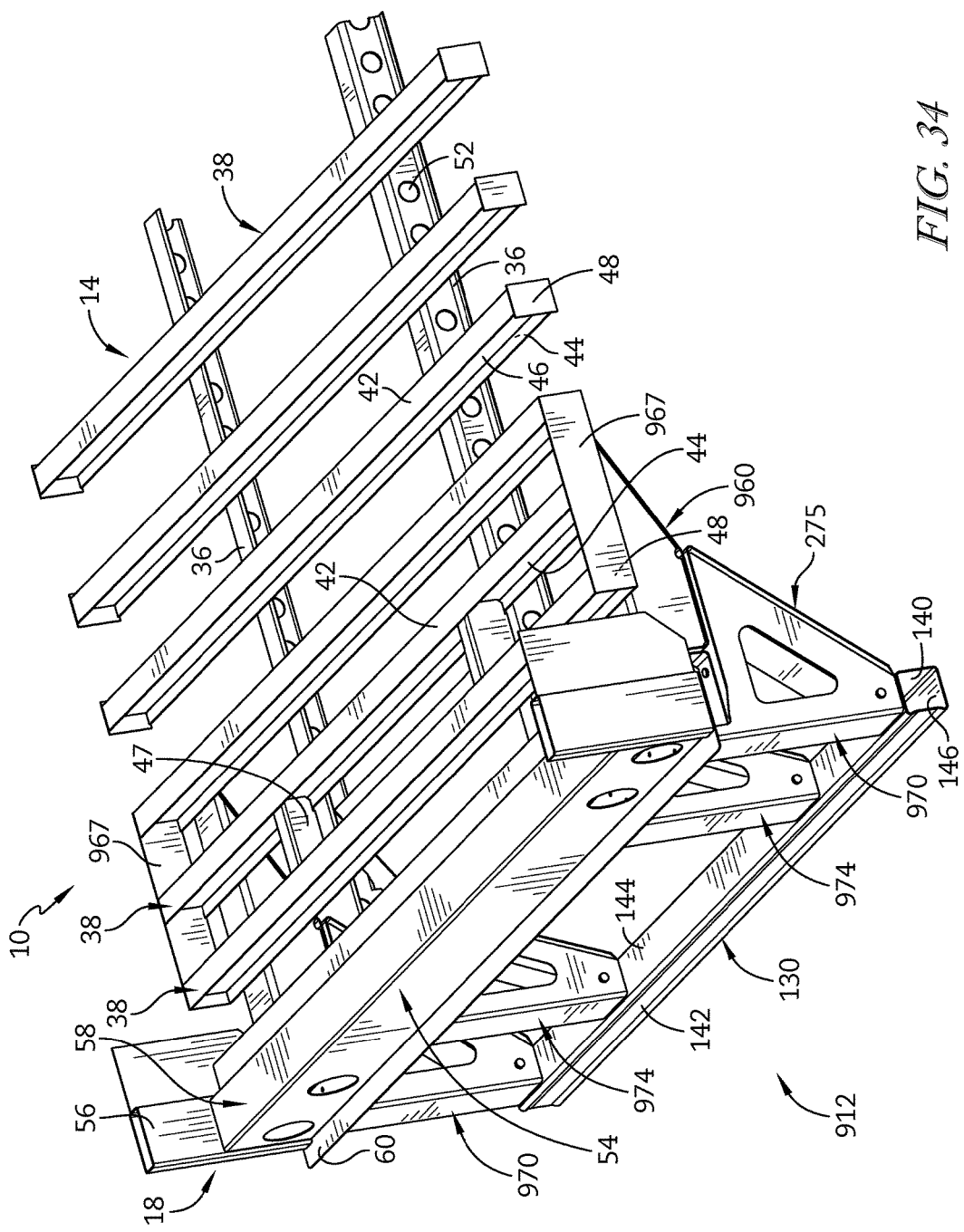
FIG. 34 is a perspective view of an alternative rear impact guard of the present disclosure showing the rear impact guard including four vertical support members coupled to the underside of a rear door frame and floor assembly of a trailer.
Figures 35, 36:
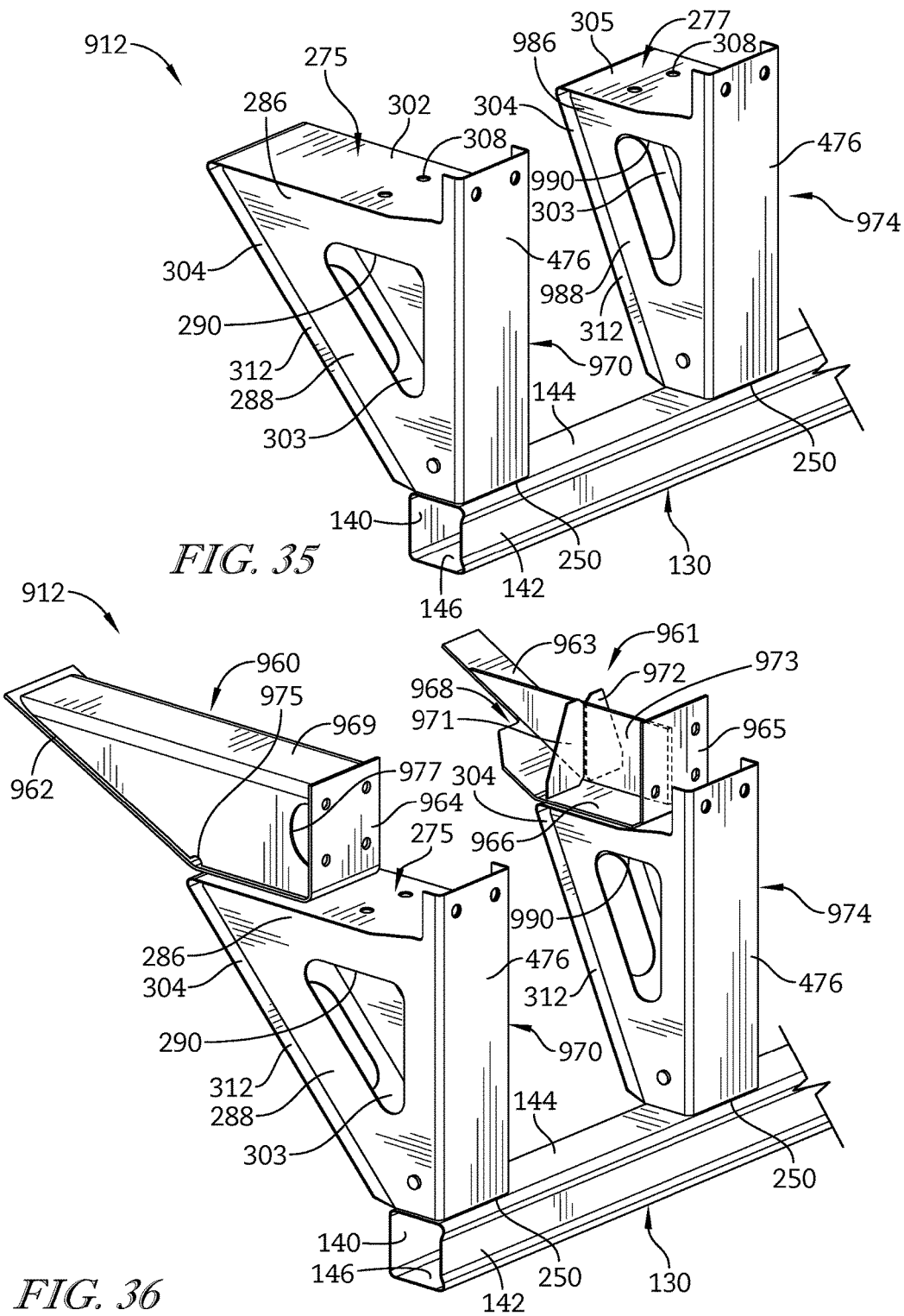
FIG. 35 is a perspective view of a portion of the rear impact guard of FIG. 34 showing an outer bumper support member and an inner bumper support member of the rear impact guard.
FIG. 36 is a perspective view of a portion of the rear impact guard of FIG. 34 showing an outer bumper support member including an outer support base and an inner bumper support member including an inner support base of the rear impact guard.
Figure 43:
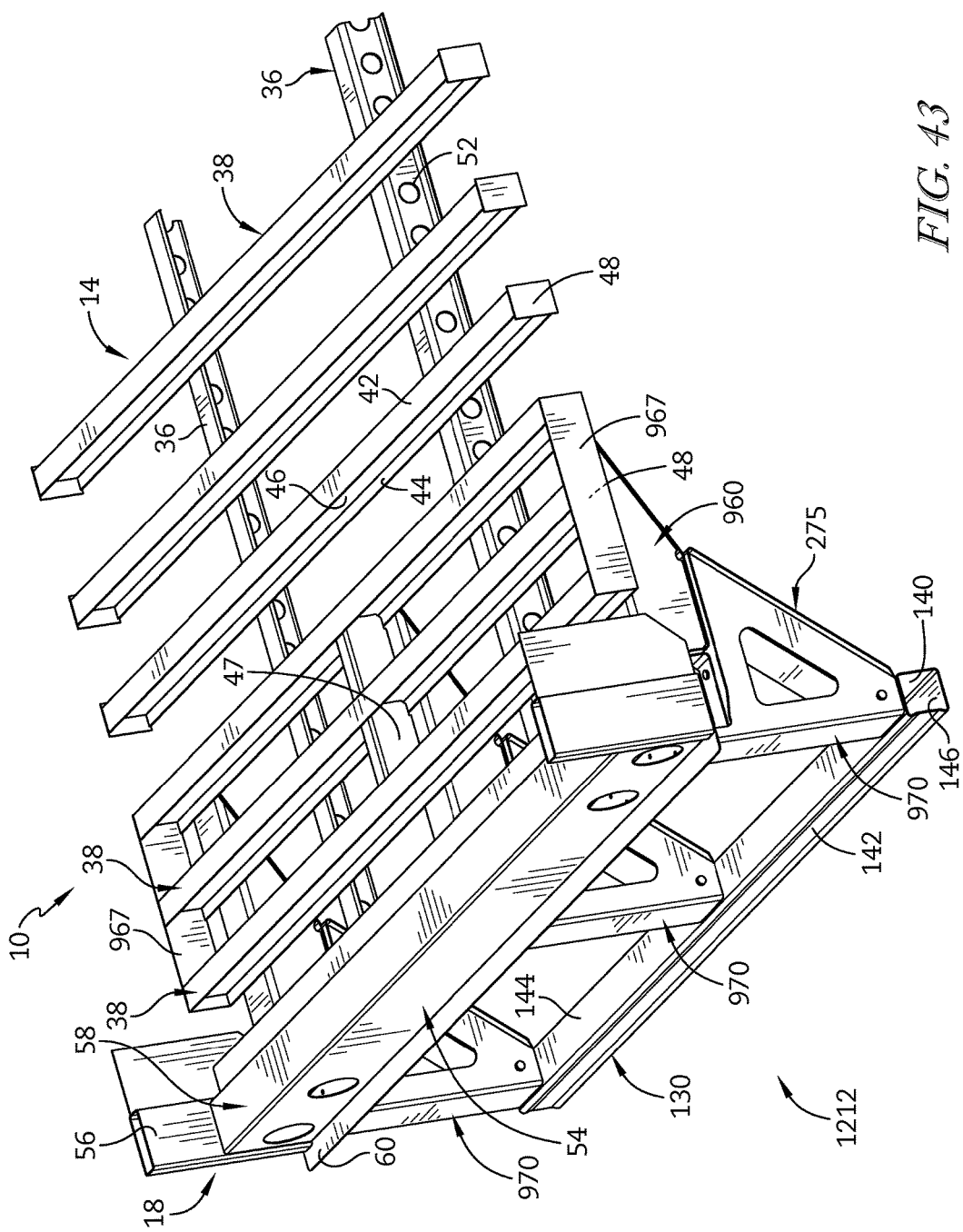
FIG. 43 is a perspective view of an alternative rear impact guard of the present disclosure showing the rear impact guard including three vertical support members coupled to the underside of a rear door frame and floor assembly of a trailer.

A trailer 10 of the present disclosure includes a rear impact guard 12, also known as rear impact guard assembly 12, coupled to and depending downwardly from the bottom of the trailer rear frame 18, also known as trailer rear frame assembly 18, and rear end of a portion of the floor assembly 14 of the trailer 10. The rear impact guard 12 is formed as a separate unit from a storage container (not shown) of the trailer 10 and can be secured onto the storage container after assembly. Illustratively, the storage container includes sidewalls 16 (only one of which is shown in FIG. 1A) and the floor assembly 14 coupled to and extending between the sidewalls 16. The storage container of the trailer 10 further includes a rear end wall assembly 18 including an end wall frame 20 and a door (not shown) coupled to the frame 20. While a post 56 may be coupled to the frame 20, illustratively it may replace the frame 20 (FIGS. 34 and 43). Rear frame assembly 18 is coupled to both the sidewalls 16 and the floor assembly 14. The storage container of the trailer 10 further includes a front end wall assembly (not shown) coupled to the sidewalls 16 and the floor assembly 14, as well as a roof assembly (not shown) coupled to the sidewalls 16 and the rear end wall assembly 18.

A pair of conventional slide rails 36 of the floor assembly 14 are attached beneath I-beam cross-members 38 (only one of which is illustratively shown in FIG. 1A) of the floor assembly, as shown in FIGS. 1A, 1B, 34, 43, 44. A conventional slidable rear undercarriage assembly (not shown) is mounted in a conventional manner to the slide rails 36. The ends of each cross-member 38 of the floor assembly 14 are coupled to a base rail 40 of each respective sidewall 16. The baserail 40 extends the length of the storage container and is preferably formed of aluminum which may be extruded.

As noted above, the floor assembly 14 includes a plurality of spaced-apart cross-members 38 attached to the base rail 40 of each sidewall 16. Each cross-member 38 is integrally formed from an I-beam that includes an upper horizontal flange 42, a lower horizontal flange 44, and a vertical web 46 extending between the upper and lower flanges 42, 44 at the midpoint thereof. Each cross-member 38 extends across the width of the storage container. A floor 50, including a plurality of floor boards, generally sits on the upper surface of the cross-members 38.

Slide rails 36 are connected to the underside of cross-members 38 at spaced-apart positions, and extend generally along the length of the storage container. As is known in the art, the slide rails 36 are elongated members which include a plurality of spaced-apart apertures 52 therethrough. This allows the undercarriage assembly (not shown) to be secured to the slide rails 36 at a variety of positions.

Figure 44:
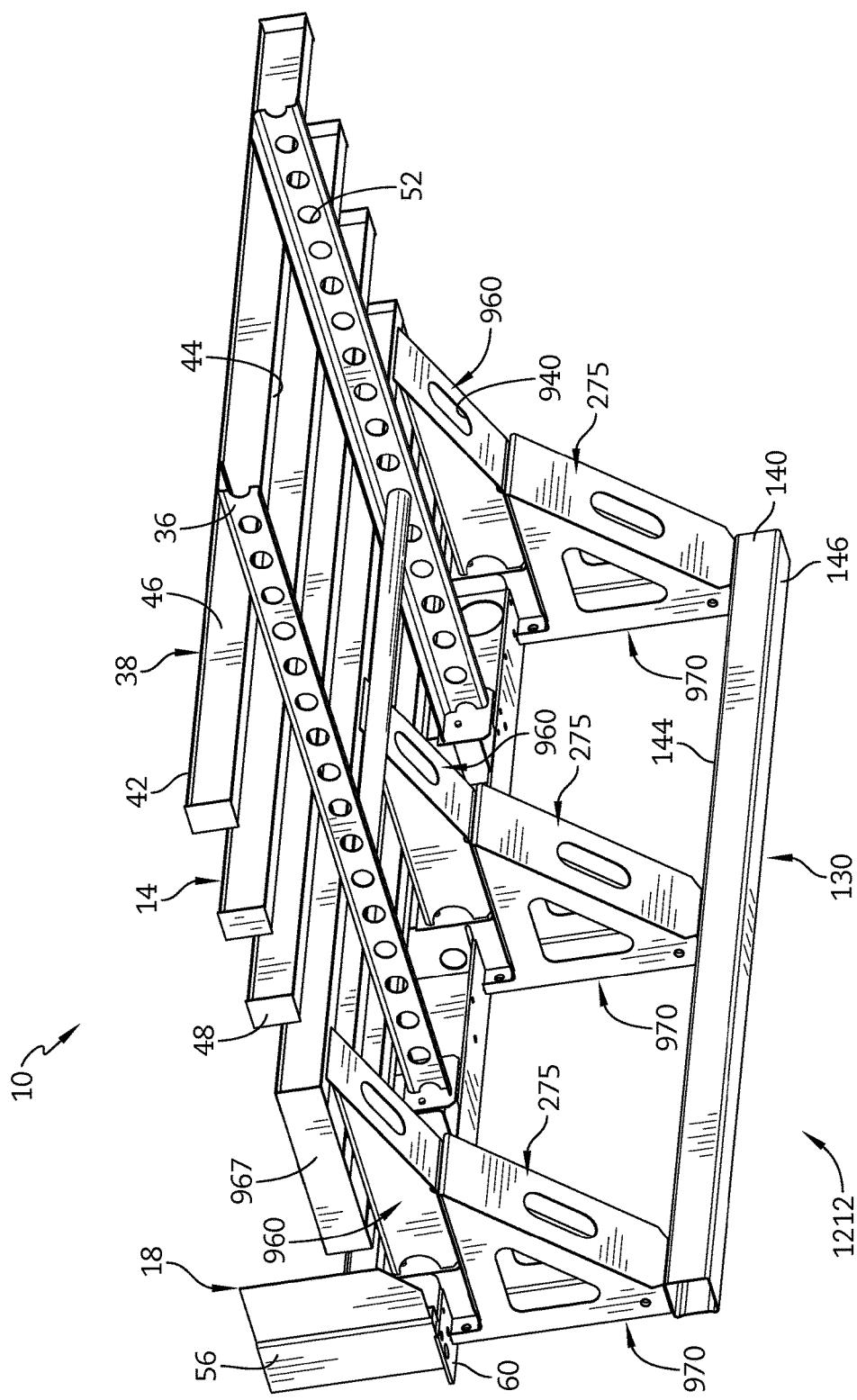
FIG. 44 is another view of the rear impact guard of FIG. 43.

Illustratively, the rear end wall assembly 18 includes the rear frame 20 which forms a rectangular opening into which the rear door or doors (not shown) are provided. The rear frame 20 includes an elongated horizontal sill 54, a pair of vertical posts 56 that extend upwardly from the opposite ends of the sill 54, and an elongated horizontal top member, i.e., rear door header, (not shown). The posts 56 are connected to the respective sidewalls 16 by rivets, but may be connected by any suitable fastener, weld, and/or adhesive. The opposite ends of the sill 54 are connected to the respective base rails 40 by known welding, but may be connected in any suitable manner. Illustratively, the sill 54 includes a fantail 58 and a base plate 60 attached to the underside of the fantail 58. As noted and seen in FIGS. 34, 43, and 44, the rear frame 20 may comprise an extended post 56. Illustratively, sill 54 may include a plurality of spaced apart cut outs or apertures (FIGS. 34, 43, 44).

As noted above, the rear impact guard 12 is coupled to the rear end wall and underside of the floor assembly 14 of the trailer 10. In particular, the rear impact guard 12 is coupled to the base plate 60 of the rear sill 54 and to the slide rails 36 of the trailer 10.

Figure 1B:
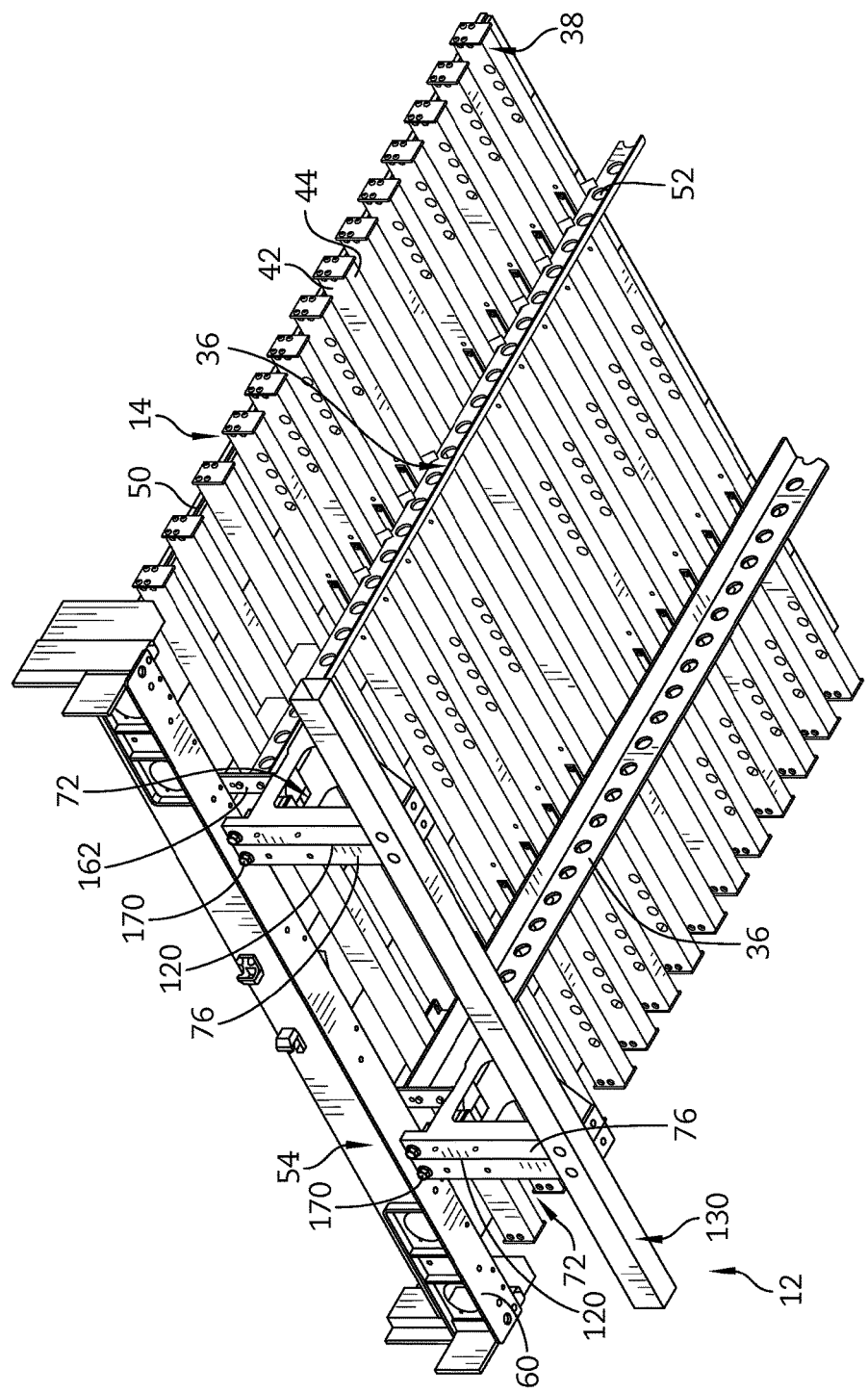
FIG. 1B is another view of the rear impact guard of FIG. 1A.
Figure 2:
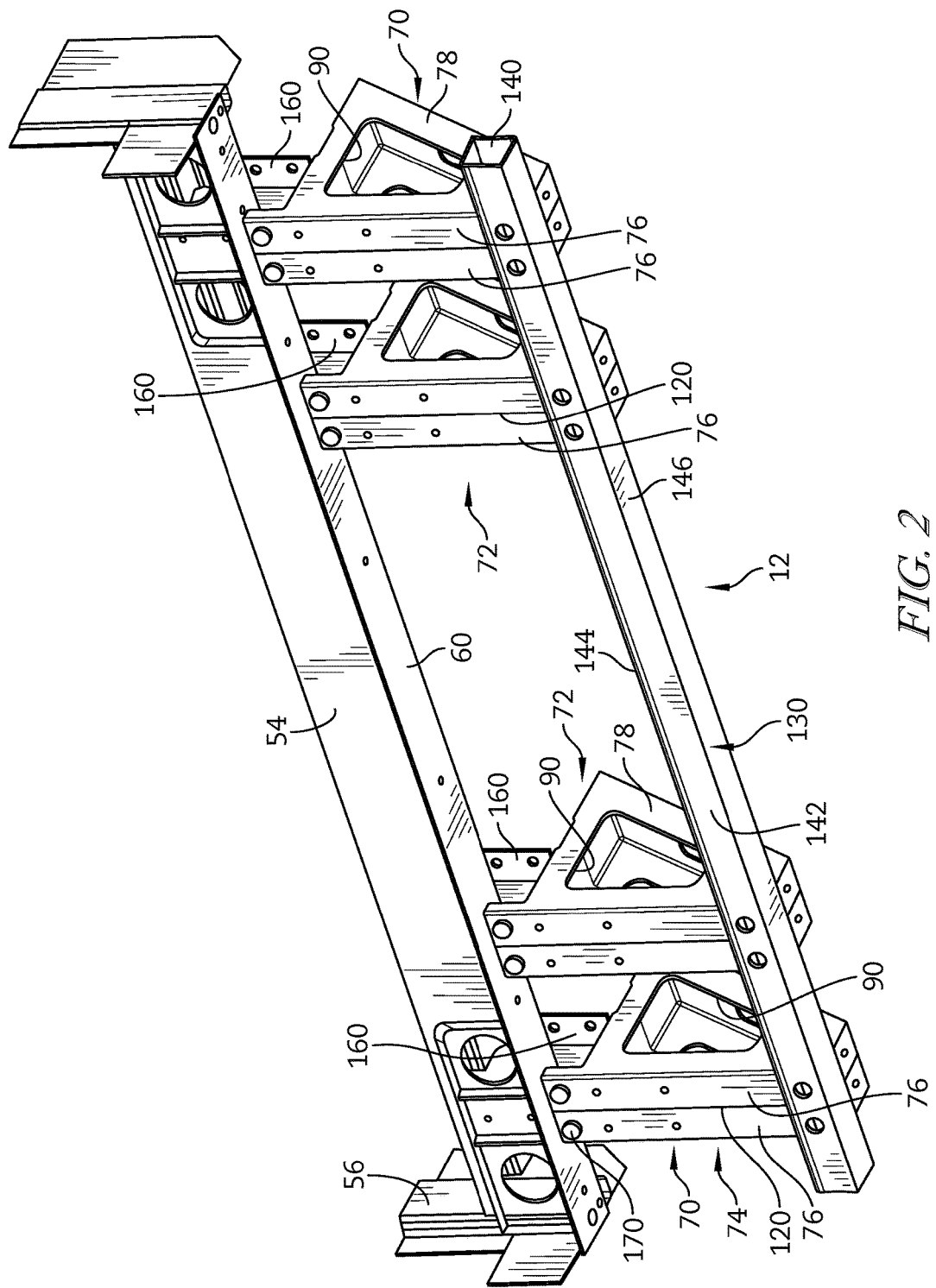
FIG. 2 is a perspective view of another rear impact guard of the present disclosure showing the rear impact guard including four vertical support members.
Figure 3:
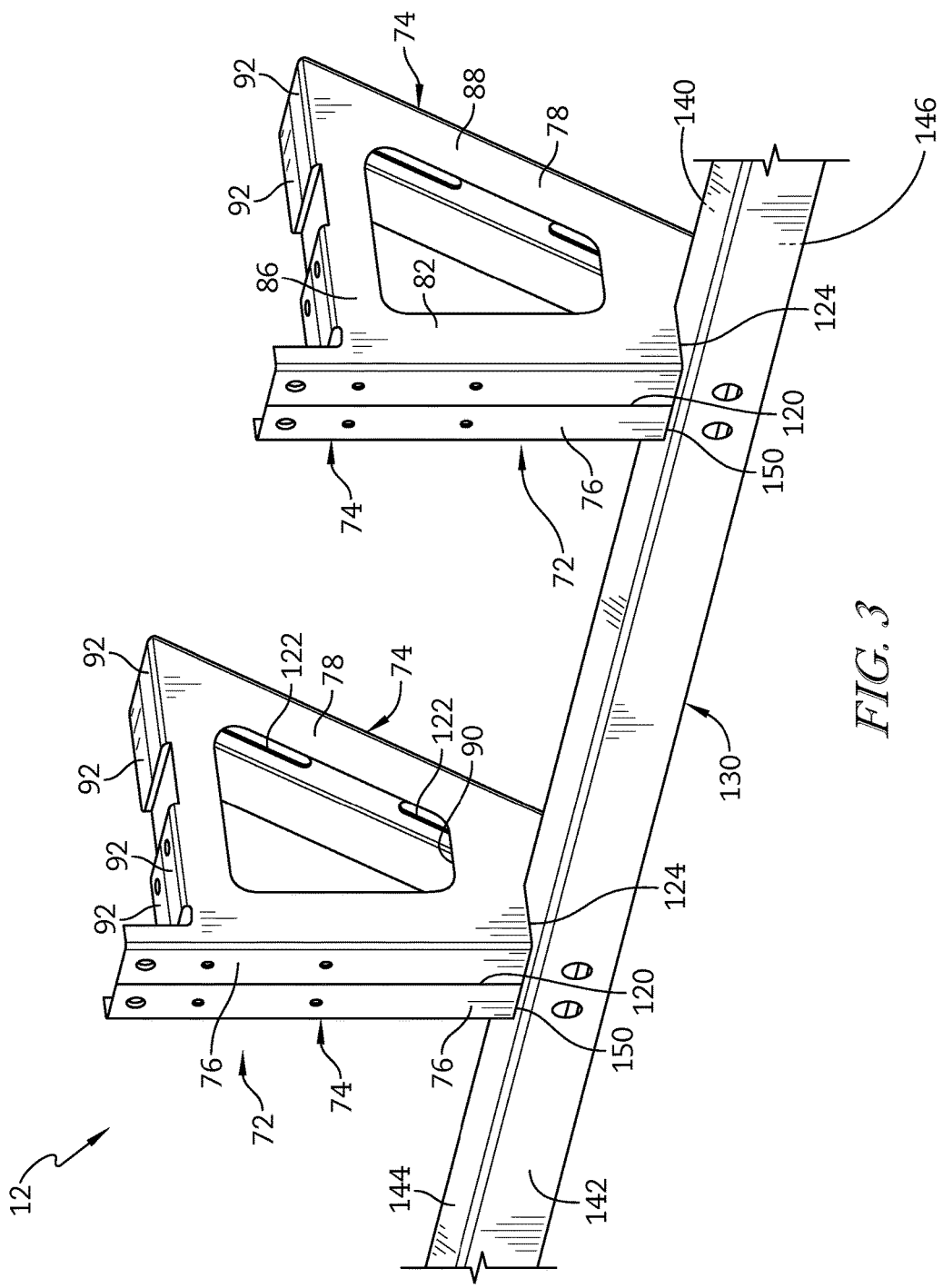
FIG. 3 is a perspective view of a portion of the rear impact guard of FIG. 2 showing the two inner bumper support members of the rear impact guard.

Illustratively, as shown in FIGS. 1A and 1B, the rear impact guard 12, also known as rear impact guard assembly 12, includes a horizontal bumper 130 as well as two vertical bumper support members 72. Further, illustratively, the rear impact guard 12 may include two additional bumper support members 70, as shown in FIG. 2, for example. As shown in FIG. 2, the additional bumper support members 70 are provided outside the two inner vertical bumper support members 72. As such, the outer vertical bumper support members 72 are positioned at a location outside the slide rails 36. Accordingly, the rear impact guard 12 shown in FIG. 2 includes right and left pairs of spaced-apart vertical bumper support members 70, 72 such that the illustrative rear impact guard 12 of FIG. 2 includes four vertical bumper support members. Each pair of vertical bumper support member includes an outermost vertical bumper support member 70 and an innermost vertical bumper support member 72. Illustratively, the outermost vertical bumper support member 70 may provide offset impact protection to vehicles in a rear-impact accident with the trailer 10. FIG. 2 illustrates both pairs of vertical support bumper members 70, 72; however, only the innermost two vertical bumper support members are shown in FIG. 3 and described herein. As such, it should be understood that the outermost two vertical bumper support members 70 are identical in shape and function to the innermost vertical bumpers. It should be understood that while the rear impact guard 12 may include two vertical bumper support members, as shown in FIGS. 1A and 1B, as well as four vertical bumper support members as shown in FIG. 3, that it is within the scope of this disclosure for the rear impact guard to include any suitable number of vertical bumper support members positioned at any suitable location along the length of the horizontal bumper 130.

Illustratively, the outermost vertical bumper support member 70 is positioned farther outward from a longitudinal centerline of the trailer 10 than the innermost vertical bumper support member 72. In other words, the outermost vertical bumper support member 70 is closer to the nearest sidewall 16 of the trailer 10 than the innermost vertical bumper support member 72. As is discussed in greater detail below, such positioning of the inner and outermost vertical bumper support members 70, 72 provides that each may be coupled to different portions of the bottom of the floor assembly 14 of the trailer 10.

Figures 4, 5:
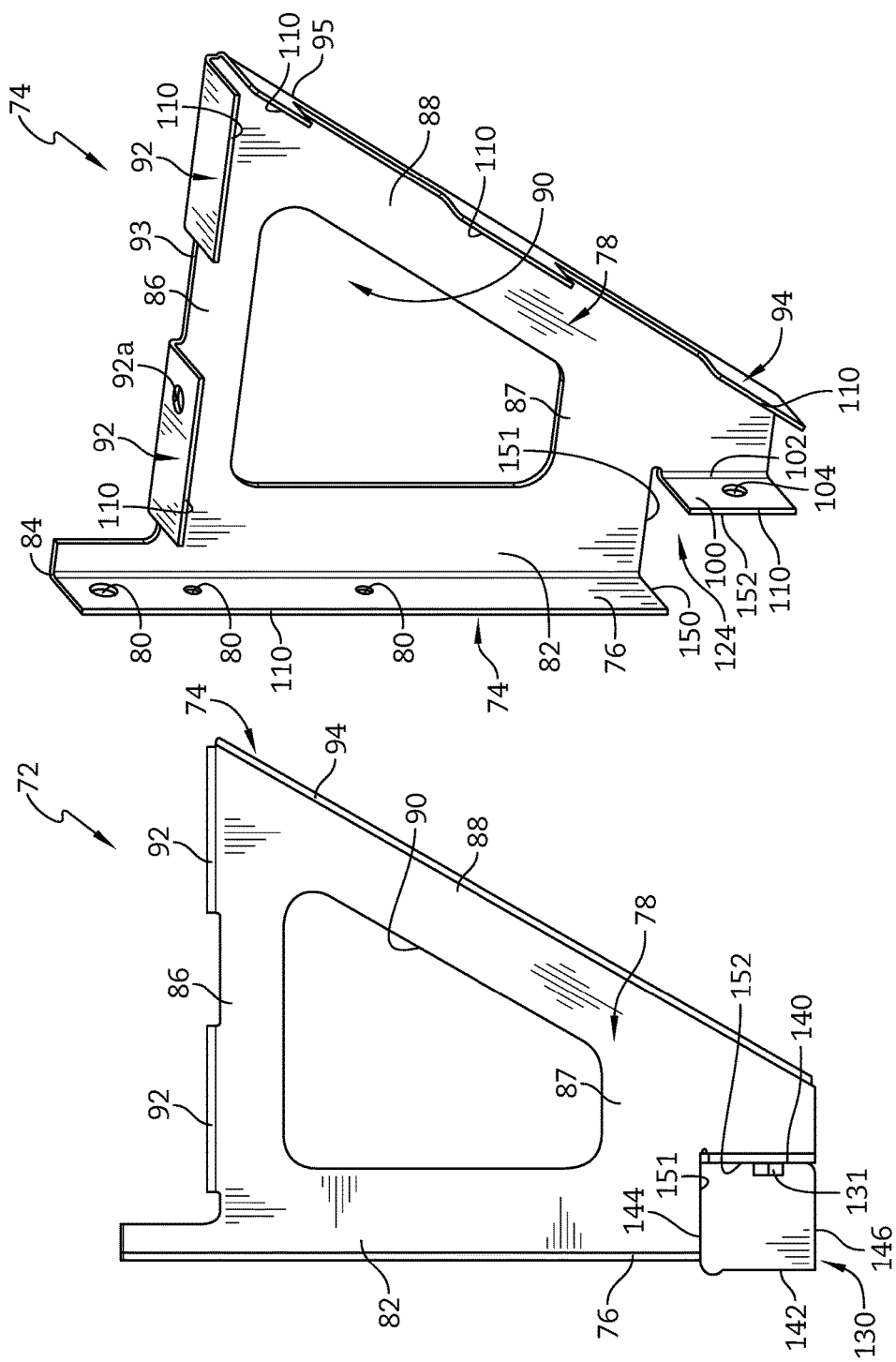
FIG. 4 is a side view of the rear impact guard of FIGS. 2-3.
FIG. 5 is a perspective view of a portion of one of the bumper support members of the rear impact guard of FIGS. 2-4.
Figure 7:
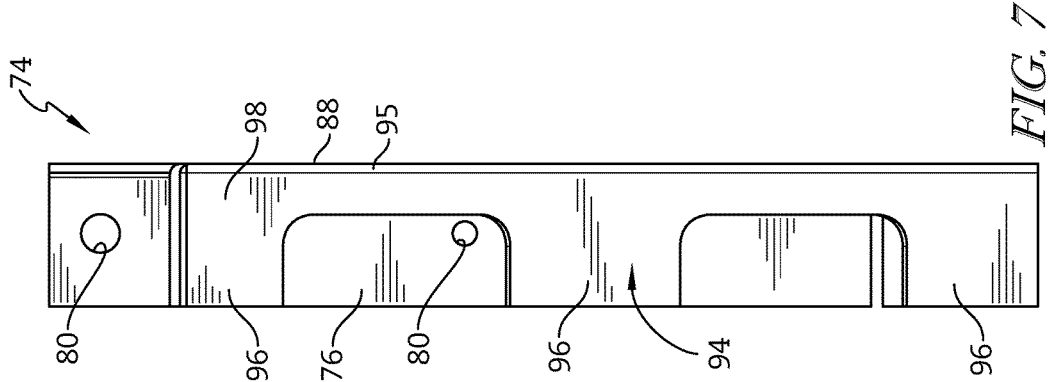
FIG. 7 is a rear view of the portion of one of the bumper support members shown in FIGS. 5 and 6.
Figure 6:
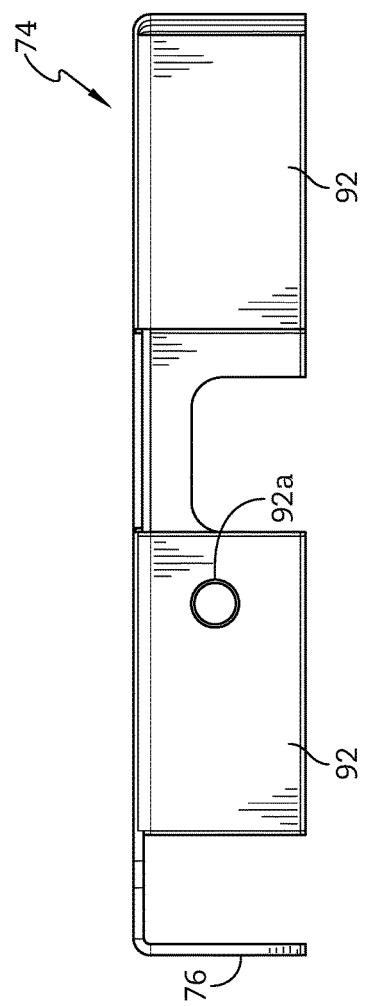
FIG. 6 is a top view of the portion of one of the bumper support members shown in FIG. 5.

Because the outermost and innermost vertical bumper support members 70, 72 are identical in structure, only the innermost vertical bumper support member 72 is described in detail herein. Like reference numerals are used to denote like components of the inner and outer vertical support members 70, 72. Illustratively, the vertical bumper support member 72 includes two mirror-image shells 74, various views of a single one of which is shown in FIGS. 5, 6, and 7. Illustratively, each shell 74 is welded to one other mirror-image shell 74 to form a single vertical bumper support member 72. Thus, each shell 74 is a generally hollow component including angles, or corners, distributed to the outside of the bumper support members 70, 72 thus providing increased torsional stability of the bumper support members 70, 72 while also minimizing the overall weight of the rear impact guard 12. Reducing the weight of the rear impact guard operates to reduce the overall weight of the trailer thus allowing the operator to either increase the load capacity of the trailer and/or lower the fuel consumption by the tractor-trailer combination.

Each shell 74 includes a rear, vertical plate 76, a side plate 78, as well as various flange members (described below) coupled to the side plate 78. As shown in FIG. 5, the vertical plate 76 is rectangular in shape and includes three apertures 80 therethrough. The top-most aperture 80 is provided to receive a fastener 170 therethrough in order to couple the vertical bumper support member 72 to a mounting bracket 160 which is then coupled to the rear door sill 54 of the trailer 10, as is discussed in greater detail below. The two lower apertures 80 are provided to receive therethrough a bolt or other fastener in order to attach a rubber bumper (not shown), for example, to protect the vertical bumper support members 70, 72 in the event the bumper support members 70, 72 impact a loading dock or other structure, for example. As shown in FIGS. 4 and 5, the side plate 78 is generally trapezoidal in shape and includes a vertical member 82 coupled to one vertical edge 84 of the vertical plate 76, an upper horizontal member 86 coupled to an upper end of the vertical member 82 and configured to extend forwardly (relative to the trailer 10) in a direction perpendicular to the vertical member 82, and a lower horizontal member 87 coupled to a lower end of the vertical member 82 and similarly configured to extend forwardly in a direction perpendicular to the vertical member 82. An angled member 88 of the side plate 78 extends between and is coupled to the forward ends of the upper and lower horizontal members 86, 77. As shown in FIG. 4, a portion of the angled member 88 extends below a lowermost-edge of the vertical plate 76 and the vertical member 82. An aperture 90 of the side plate 78 is generally trapezoidal in shape and defined by the vertical member, 82, upper horizontal member 86, lower horizontal member 87, and angled member 88 of the side plate 78.

Illustratively, while the side plate 78 is described above as being generally trapezoidal in shape, it should also be understood that the side plate 78 is also generally triangular in shape and that the small lower horizontal member 87 be considered as part of the vertical member 82 and/or the angled member 88. In other words, it is within the scope of this disclosure to consider the side plate 78 to be generally triangular in shape and including the vertical member 82, the upper horizontal member 86 and the angled member 88.

The shell 74 further includes a pair of flanges 92 coupled to a top edge 93 of the upper horizontal member 86. The flanges 92 are spaced-apart from each other and configured to extend inwardly in a direction perpendicular to a plane defined by the upper horizontal member 86. Illustratively, the flanges 92 define a horizontal plane that is generally parallel to a plane defined by the floor boards 50 of the floor assembly 14. As shown in FIG. 5, one of the flanges 92 includes an aperture 92*a* formed therethrough. As is discussed in greater detail below, the aperture 92*a* is configured to receive a fastener, such as a bolt, to couple the vertical bumper support member 72 to the floor assembly 14 of the trailer 10.

The shell 74 further includes another flange 94 coupled to an outer edge 95 of the angled member 88 of the side plate 78. As shown in FIGS. 4 and 6, the flange 94 extends inwardly in a direction generally perpendicular to the angled member 88 and includes a flange plate 98 and three flange members 96 extending away from the flange plate 98 such that the flange 94 is generally shaped like the number three when the shell 74 is viewed from a rear end as shown in FIG. 7. Finally, the shell 74 includes yet another flange 100 extending inwardly from a lower, vertical edge 102 of the angled member 88. The flange 100 is perpendicular to the plane defined by the side plate 78 and includes an aperture 104 formed therethrough.

As noted above, the vertical bumper support member 72 includes two mirror-image shells 74. The shells 74 are welded to one another along an outer edge 110 of each respective vertical plate 76, upper flanges 92, flange portions 96 of the angled flange plate 94, and bottom flange 100 to form a central weld seam 120 (shown in FIGS. 1-3) along the edge portions of each of the vertical plate 76 and the side plate 78. As shown in FIG. 3, the edges 110 of the vertical plates 76 of each shell 74 are welded together, and the edges 110 of the flanges 92, 96, 100 of the side plate 76 of each shell 74 are welded to each other to form a single vertical bumper support member 70 and 72. While the illustrative shells 74 of each vertical support bumper 70, 72 disclosed herein are welded to each other along the edges 110 of each shell 74, it is within the scope of this disclosure the shells 74 to be coupled to each other by other suitable fasteners, such as through the use of bolts, rivets, screws, and/or adhesives, for example. Further, while the illustrative vertical bumper support members 70, 72 are made of two separate shells 74 which are coupled together, it is within the scope of this disclosure for each vertical bumper support member 70, 72 to be made of any number of components such that each vertical bumper support member 70, 72 may include one, unitary component, or a plurality of separate components that are coupled to each other using any suitable fastener or fastening means.

Illustratively, the assembled vertical bumper support member 72 includes two apertures 90 formed through the side plate 78 of each shell 74 of the bumper 72 as well as two apertures 122 formed between the adjoining flange plates 94 of the shells 74. A cut-out portion 124, half of which is shown by the shell 74 in FIG. 5, of the vertical bumper support member 72 is configured to receive the horizontal bumper 130. The horizontal bumper 130 is generally formed as a tube having a front wall 140, a rear wall 142, a top wall 144, and a bottom wall 146. In particular, the front wall 140 and the bottom wall 146 are formed of a single piece of steel having one bend formed therein to form an L-shaped member, and the top wall 144 and the rear wall 142 are similar formed of a single piece of steel having one bend formed therein to form an L-shaped member. Each L-shaped member is welded to each other L-shaped member to form the horizontal bumper 130. As is stated above in regard to the vertical bumper support members 70, 72, the horizontal bumper 130 may comprise one component or any number of components coupled to each other by any suitable means including, for example, through the use of rivets, screws, bolts, welds, and/or adhesives.

As noted above, the horizontal bumper 130 is received within the cut-out portion 124 of the vertical bumper support members 70, 72 such that a bottom edge 150 of the vertical plate 76 and a common bottom edge 151 of the lower horizontal member 87 and the vertical member 82 of the side plate 78 of each shell 74 are engaged with and rest upon the top wall 144 of the horizontal bumper 130. Further, a rearwardly-facing surface 152 of the flange 100 of each shell 74 is engaged with the front wall 140 of the horizontal bumper 130. Illustratively, the horizontal bumper 130 is welded and bolted to each of the two pairs of vertical bumper support members 70, 72. In particular, a bolt 131 (shown in FIG. 4) is received through an aperture (not shown) of the front wall 140 of the horizontal bumper 130 and the aperture 104 of the flange 100 of each shell 74 in order to further fasten horizontal bumper 130 to the vertical bumper support members 70, 72. While the vertical bumper support members 70, 72 are coupled to the horizontal bumper 130 in the manner described above, it is within the scope of this disclosure to couple the horizontal bumper 130 and the vertical bumper support members 70, 72 using other suitable fasteners including additional or fewer bolts, welding additional or fewer welds, rivets, screws, and/or adhesives, for example.

As shown in FIGS. 1 and 2, the vertical bumper support members 70, 72 are coupled to the rear door sill 54 by mounting brackets 160. Illustratively, each mounting bracket 160 is generally U-shaped and includes a front arm 162, a rear arm 164, and a center member 166 coupled to and extending between each of the front and rear arms 162, 164. As shown in FIGS. 1 and 2, the rear arm 164 is coupled to the upper portion of the adjoining vertical plates 76 of each vertical bumper support member 70, 72. Specifically, the rear arm 164 is coupled to the vertical plates 76 by a fastener, such as a bolt 170 received through the upper-most aperture 80 of each vertical plate 76 as well as two corresponding apertures (not shown) of the mounting bracket 160. The center member 166 is adjacent to and coupled with the adjacent, rear-most flanges 92 of each vertical bumper support member 70, 72 by a fastener, such as a bolt (not shown) received through the aperture 92a of each flange 92 as well as through two corresponding apertures (not shown) of the center member 166 of the mounting bracket 160. The upper ends of the front and rear arms 162, 164 of the mounting bracket 160 are welded to the bottom surface of the base plate 60 of the sill 54.

As noted above, the rear impact guard 12 includes two pairs of spaced-apart vertical bumper support members or brackets 70, 72 and a horizontal bumper 130 which is mounted to the lower ends of the bumper support members or brackets 70, 72. The horizontal bumper 130 is formed as a closed end tube. The bumper 130 is secured to the lower ends of bumper support members or brackets 70, 72 by suitable means, such as welding. Illustratively, the spacing and placement of the vertical bumper support members 70, 72 or brackets 70, 72 with respect to each other may be varied. In other words, the outer-most vertical bumper support members or brackets 70 may be moved inwardly or outwardly relative to the longitudinal axis of the trailer 10. Further, the inner-most vertical bumper support members 72 or brackets 72 may be moved inwardly or outwardly relative to the longitudinal axis of the trailer 10.

It should be understood that that while the particular rear impact guard 12 shown in FIGS. 2-7 and described above includes two vertical bumper support members 70 and two vertical bumper support members 72, the rear impact guard may be configured to only include two spaced-apart vertical support bumper support members 72, such as that shown in FIG. 1, for example. Additionally, a rear impact guard 12 may be configured to include any number of vertical bumper support members 70 or 72.

Figure 10:
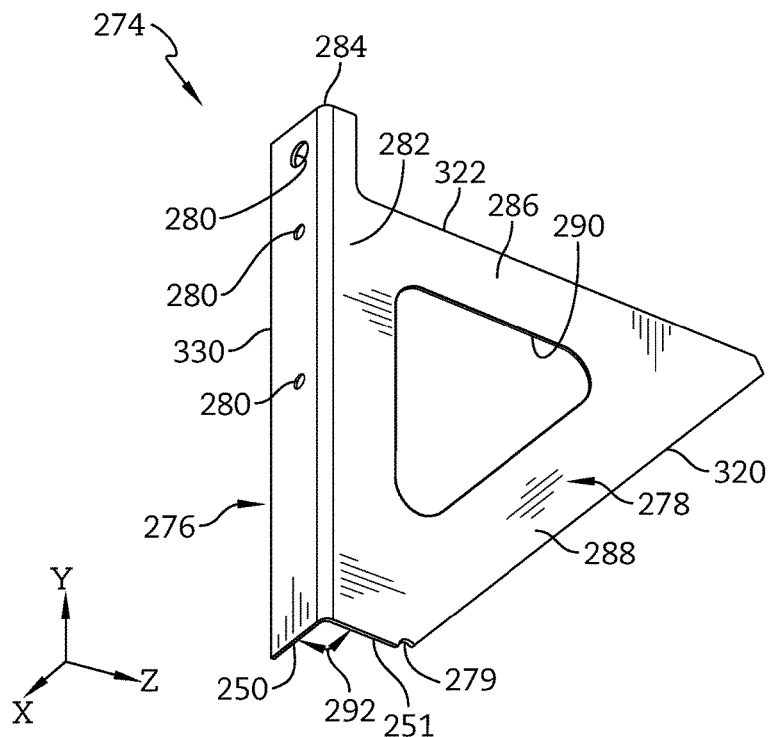
FIG. 10 is a perspective view of a portion of the bumper support member of FIGS. 8 and 9.
Figure 11:
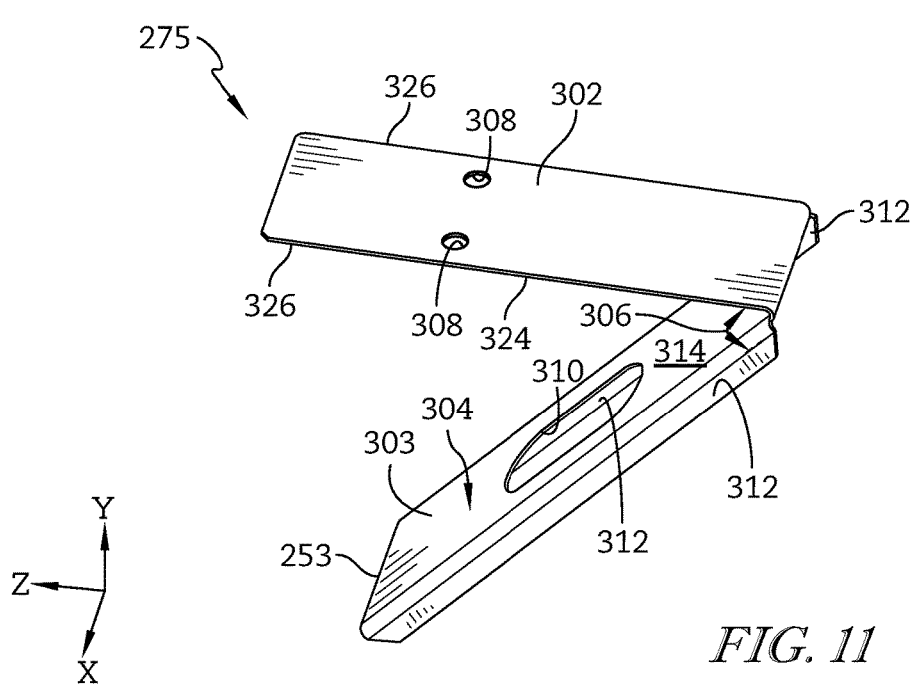
FIG. 11 is a perspective view of another portion of the bumper support member of FIGS. 8 and 9.
Figure 12:
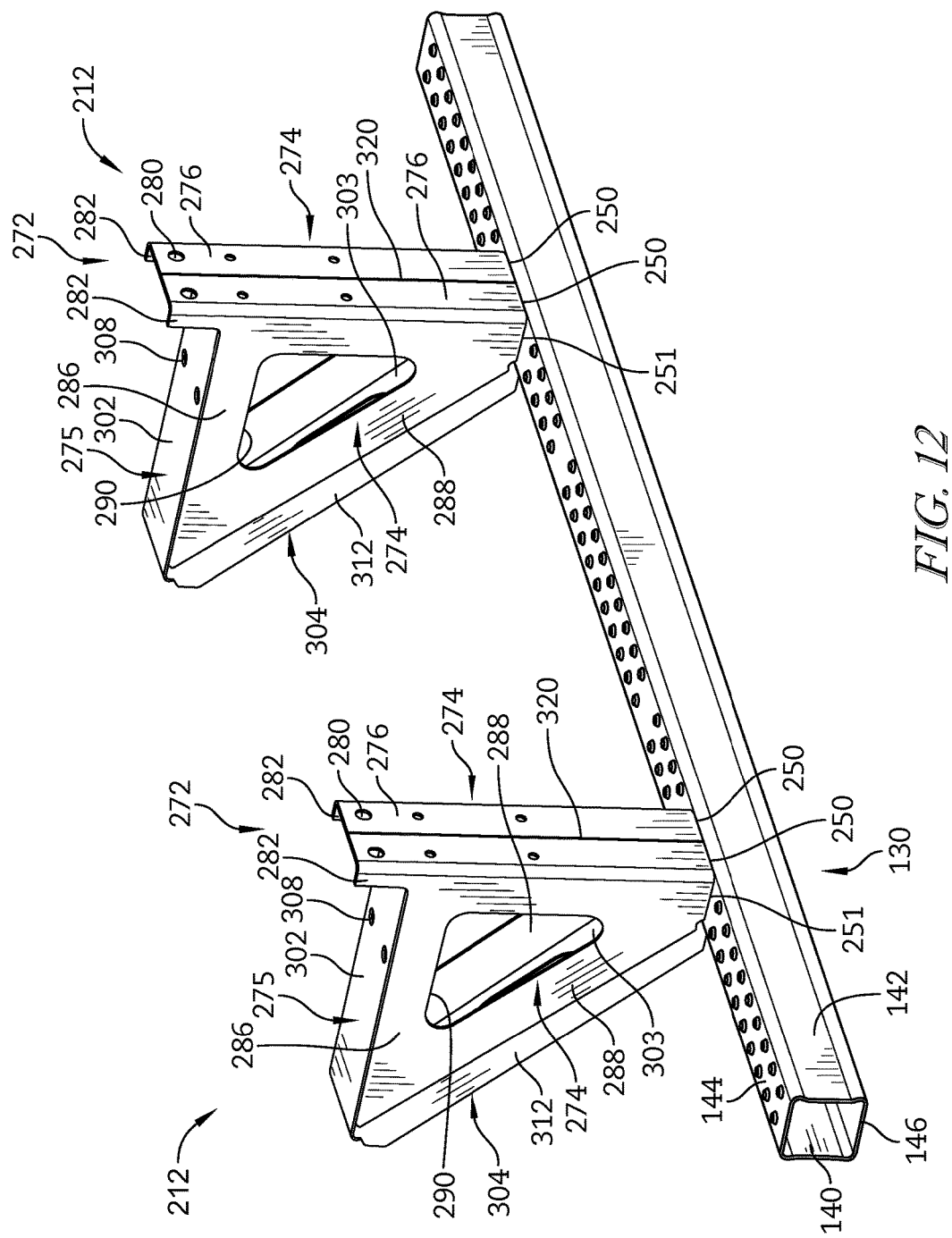
FIG. 12 is a perspective view of a rear impact guard including the bumper support member of FIGS. 8 and 9.

Looking now to FIGS. 8-12, an alternative rear impact guard 212 is provided. The rear impact guard 212 includes two spaced-apart vertical bumper support members 272, as shown in FIG. 12, and the horizontal bumper 130 coupled to each of the vertical bumper support member 272. Because the vertical bumper support members 272 are identical in structure, only one of the vertical bumper support members 272 is described in detail herein. Like reference numerals are used to denote like components of the two vertical support members 272. It should be understood that while the particular rear impact guard 212 includes two vertical bumper members 272, the rear impact guard may be configured to include any suitable number of vertical bumper support members 272. For example, the rear impact guard 212 may be configured to include two additional vertical bumper support members 272 located generally at the outer ends of the horizontal bumper 130 such that the rear impact guard 212 includes a total of four vertical bumper support members 272. As noted above in regard to the rear impact guard 12, the vertical bumper support member or members 272 may be located at any suitable position or positions along the length of the bumper 130.

Illustratively, the vertical bumper support member 272 includes two mirror-image shells 274 (shown in FIG. 10) and a center member 275 coupled to the shells 274. Illustratively, each shell 274 is welded to one other mirror-image shell 274 and the center member 275 is positioned between and welded to the two shells 274 to form a single vertical bumper support member 70. Each shell 274 includes a rear, vertical plate 276 and a side plate 278 coupled to the vertical plate 276. As shown in FIG. 10, the vertical plate 276 is rectangular in shape and includes three apertures 280 therethrough. Similar to the apertures 80 described above with regard to the vertical bumper support member 72, the upper aperture 280 is provided to bolt the bumper support member 272 to the floor assembly 14 of the trailer 10 while the two lower apertures 280 are provided to receive therethrough a bolt or other fastener in order to attach a rubber bumper (not shown), for example, to protect the bumper members 272, 272 in the event the bumper members 272, 272 impact a loading dock or other structure, for example. The side plate 278 is generally triangular in shape and includes a vertical member 282 coupled to one vertical edge 284 of the vertical plate 276, an upper horizontal member 286 coupled to an upper end portion of the vertical member 282 and configured to extend forwardly (relative to the trailer 10) in a direction generally perpendicular to the vertical member 282, and an angled member 288 of the side plate 278 extending between and coupled to the forward ends of the upper horizontal member 286 and the vertical member 282. A notch 279 is formed between the angled member 288 and the vertical member 282. As shown in FIG. 10, an aperture 290 of the side plate 278 is generally triangular in shape and defined by the vertical member 282, the upper horizontal member 286, and the angled member 288 of the side plate 278.

Figure 8:
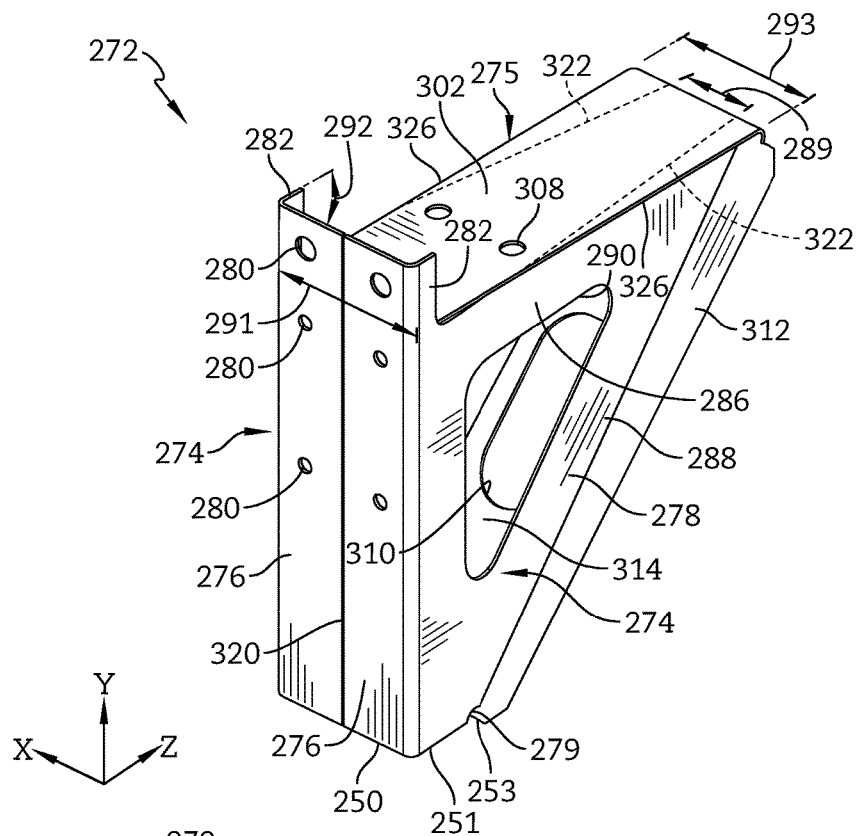
FIG. 8 is a perspective view of an alternative bumper support member of an alternative rear impact guard (shown in FIG. 12) of the present disclosure.
Figure 9:
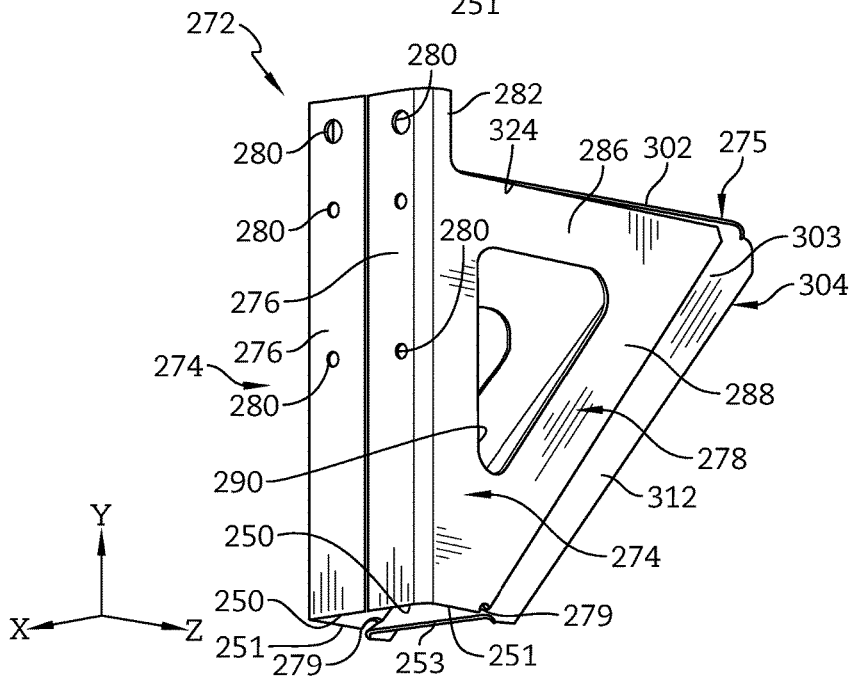
FIG. 9 is another perspective view of the bumper support member of FIG. 8.

Illustratively, an angle 292 (shown in FIGS. 8 and 10) between the vertical plate 276 and the vertical member 282 is approximately 87 degrees. Thus, the side plate 278 is not perpendicular to the vertical plate 276, but rather angles slightly inwardly such that when the two identical shells 274 are coupled together, as shown in FIG. 8, a distance 289 between a forward-most end of the side plates 278 is smaller than a distance 291 between a rearward-most end of the side plates 278. In particular, the distance 289 is approximately 4 inches while the distance 291 is approximately 6 inches. It should be understood that while the angle 292 is approximately 87 degrees, the shell 274 may define any suitable angle between the vertical plate 276 and the vertical member 282 that is less than 90 degrees, equal to 90 degrees, or greater than 90 degrees.

The vertical bumper support member 272 or bumper bracket 272 further includes a center member 275, shown in FIGS. 8 and 11, coupled to each shell 274. The center member 275 includes an upper, horizontal member 302 and a lower member 304. An illustrative angle 306 between the upper member 302 and the lower member 304 is approximately 48 degrees. However, it should be understood that any suitable angle may be used. The angle member 275 is illustratively a one-piece member; however, it is within the scope of this disclosure for the angle member 275 to be made of more than one component.

The upper member 302 includes two apertures 308 configured to receive a fastener therethrough in order to couple the vertical bumper support member 272 to the undercarriage of the floor assembly 14 of the trailer 10. The apertures 308 are configured to each receive a fastener, such as a bolt (not shown) to couple the vertical bumper support member 272 to the floor assembly 14. A mounting bracket (not shown) the same as or similar to the mounting bracket 160 described above in regard to the rear impact guard 12 may be used to couple the vertical bumper support members 272 to the undercarriage of the floor assembly 14 in the same or similar manner as that described above in regard to the vertical bumper support members 70 and 72. The lower member 304 includes an elongated aperture 310. The aperture 310 operates to lessen the amount of material used to manufacture the vertical bumper support member 272, thus minimizing the overall weight of the member 272. The aperture 310 may also operate as a drainage holes for the bumper support member 272 when the member 272 is painted and/or galvanized via a hot, as is discussed in. For example, when the bumper support member 272 is painted and/or galvanized via a hot-dip galvanization process, the paint or molten zinc bath into which the bumper support member 272 may be submerged is allowed to drain from between the shells 274 and center member 275 via the aperture 310, as is described in greater detail below. The lower member 304 includes a central body 303 and side flanges 312 coupled to the central body 303 and oriented at approximately a 90 degree angle to an inner surface 314 of the lower member 304 and oriented in a forward direction. The side flanges 312 operate to provide additional strength to the lower member 304 to help prevent the lower member 304 from buckling under compression.

As shown in FIG. 8, the center member 275 is generally located between the two shells 274 of the vertical bumper support member 272 such that an outer edge 320 of the angled member 288 of the shell 274 is welded the inner surface 314 of the lower member 304 of the center member 275. Further an upper edge 322 of the side member 278 of the shell 274 is also welded to the upper member 302 of the angle member 275 such that the forward-most portion of the edge 322 is welded to a bottom surface 324 of the upper member 302 while the rearward-most portion of the edge 322 (adjacent the vertical member 276 of the shell 274) is welded to an outer edge 326 of the upper member 302. As shown in FIG. 8, the forward-most portion of the side member 278 is located inward of the outer edges 326 of the upper member 302 due to the angle 292 between the vertical member 276 and the side member 278 being less than 90 degrees. Illustratively, as noted above, the distance 289 between the forward-most ends of the horizontal member 286 of the shells 274 of each vertical bumper bracket 272 or bumper support member 272 is approximately 4 inches while a distance 293 between the outer edges 326 of the upper member 302 is approximately equal to the distance 291, or 6 inches. The shells 274 are also welded to each other along a vertical edge 330 of the vertical member 276 of each shell 274 in order to create a center weld seam 320 between the edges 330 of the vertical plate 276 of each shell 274. It should be noted that while the center member 275 is welded to the shells 274 of the vertical bumper support member 272 or bumper bracket 272 and the shells 274 of each vertical bumper support member 272 or bumper bracket 272 are welded to each other, these components may be coupled to each other by other suitable means including through the use of adhesives as well as various mechanical fasteners such as rivets, bolts, screws, etc. Further, as is discussed in greater detail below, while the illustrative vertical bumper support members 272 are made of two separate shells 274 and a center member 275 which are coupled together, it is within the scope of this disclosure for each vertical bumper support member 272 to be made of any number of components such that each vertical bumper support member 272 may include one unitary component, or a plurality of separate component that are coupled to each other using any suitable fastener or fastening means.

Illustratively, as shown in FIG. 12, the vertical bumper support members 272 are coupled to the top and front members 144, 140 of the horizontal bumper 130 similar to the manner in which the vertical bumper support members 70, 72 are coupled to the horizontal bumper 130. In particular, a bottom edge 250 of the vertical plate 282 and a bottom edge 251 of the vertical member 282 of the side plate 278 of each shell 274 are engaged with and rest upon the top wall 144 of the horizontal bumper 130. Illustratively, the horizontal bumper 130 is welded to each bumper support member 272 along the bottom edges 250, 251 of the shells 274 of each member 272. A bottom edge 253 of the center member 275 is welded to the front wall 140 of the horizontal bumper 130. While the vertical bumper support members 272 are each coupled to the horizontal bumper 130 in the manner described above, it is within the scope of this disclosure to couple the horizontal bumper 130 and the vertical bumper support members 272 to each other using other suitable fasteners including the use of bolts, additional or few welds, rivets screws, and/or adhesives, for example.

Figure 13:
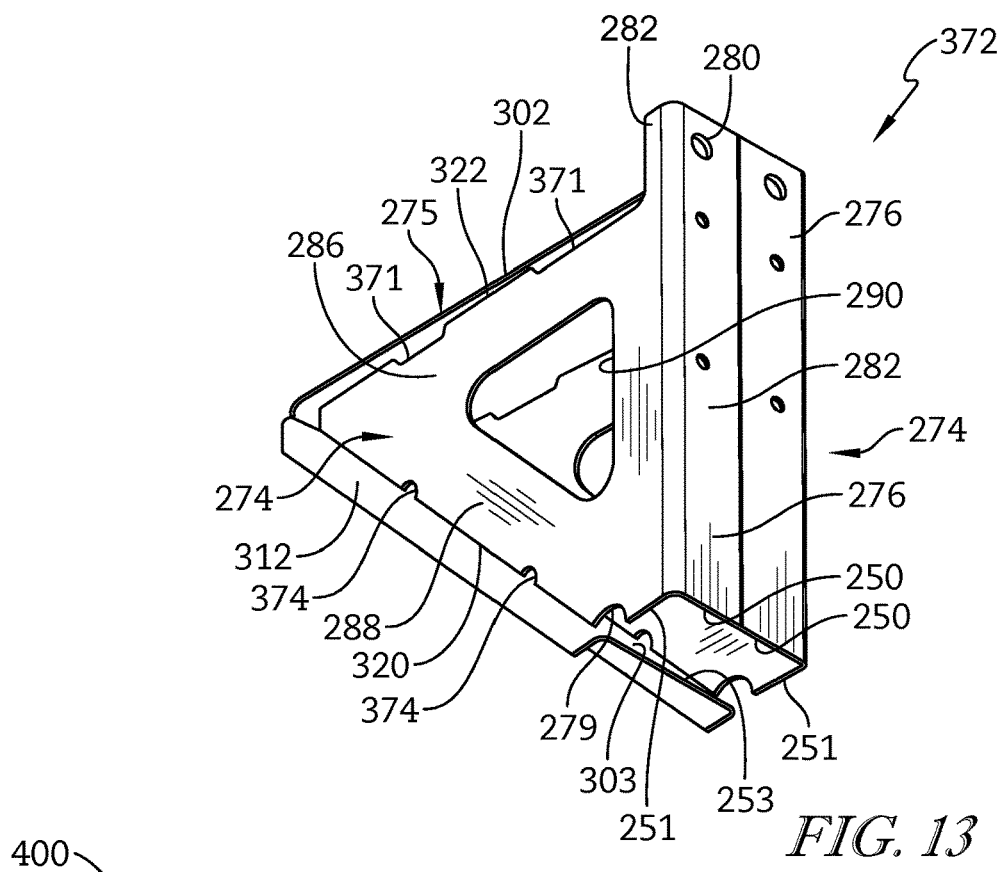
FIG. 13 is a perspective view of another alternative bumper support member similar to that shown in FIGS. 8 and 9.

Looking now to FIG. 13, an alternative vertical bumper support member 372 is provided. Illustratively, the vertical bumper support member 372 is similar to the vertical bumper support members 272 described above. Thus, like references numerals are used to denote like components. Further, the vertical bumper support member 372 is coupled to both the floor assembly 14 of the trailer as well as to the horizontal bumper 130 in the same or similar manner as that described above in regard to the vertical bumper support members 272.

Different from the vertical bumper support member 272, each shell 274 of the illustrative vertical bumper support member 372 includes two upper cut-outs 371 formed along the upper edge 322 of the side plate 278. Further, each shell 274 of the bumper support member 372 of FIG. 13 includes two notches 374 along the outer edge 320 of the angled member 288 of the side plate 278. Illustratively, the notches 371, 374 operate to provide drainage holes of the bumper support member 372. For example, when the bumper support member 372 is painted and/or galvanized via a hot-dip galvanization process, the paint or molten zinc bath into which the bumper support member 372 may be submerged is allowed to drain from between the shells 274 and center member 275 via the notches 371, 374 once the bumper support member 372 is removed from the bath. The notch 279 provides further access for drainage of any liquid material into which the bumper support member 372 may be submerged. The upper-most apertures 280 of the vertical plate 276 of each shell 274 may be used to receive a hanger or hook (not shown) after the bumper support member 372 is painted and/or galvanized in order to allow the excess paint and/or liquid zinc to drain from the bumper support member 372.

Illustratively, the notches 371 and 374 may also operate as a visual indicator during the welding process. In particular, the notches 374 provide an indicator to the welder as to where to start and stop welding when welding the outer edge 320 of each shell 274 to the center member 275. Similarly, the notches 371 provide a visual indicator to the welder as to where to start and stop welding when welding the upper edge 322 of each shell 274 to the center member 275.

Figure 14:
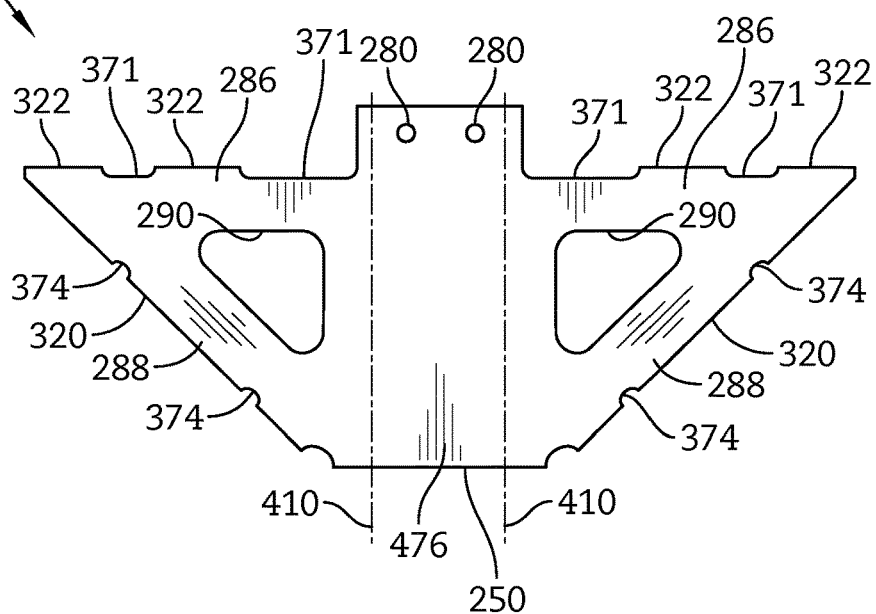
FIG. 14 is a plan view of a first flat component to be formed into a first portion of the bumper support member of FIG. 13.
Figure 15:
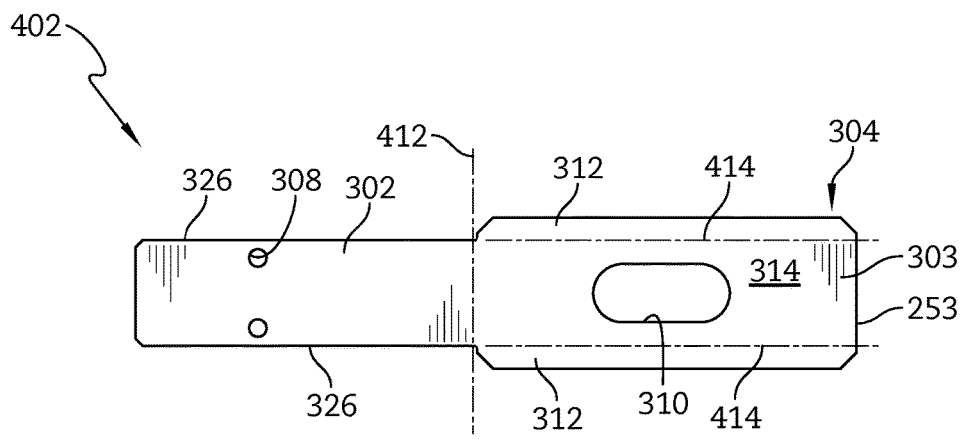
FIG. 15 is a plan view of a second flat component to be formed into a second portion of the bumper support member of FIG. 13.
Figure 16:
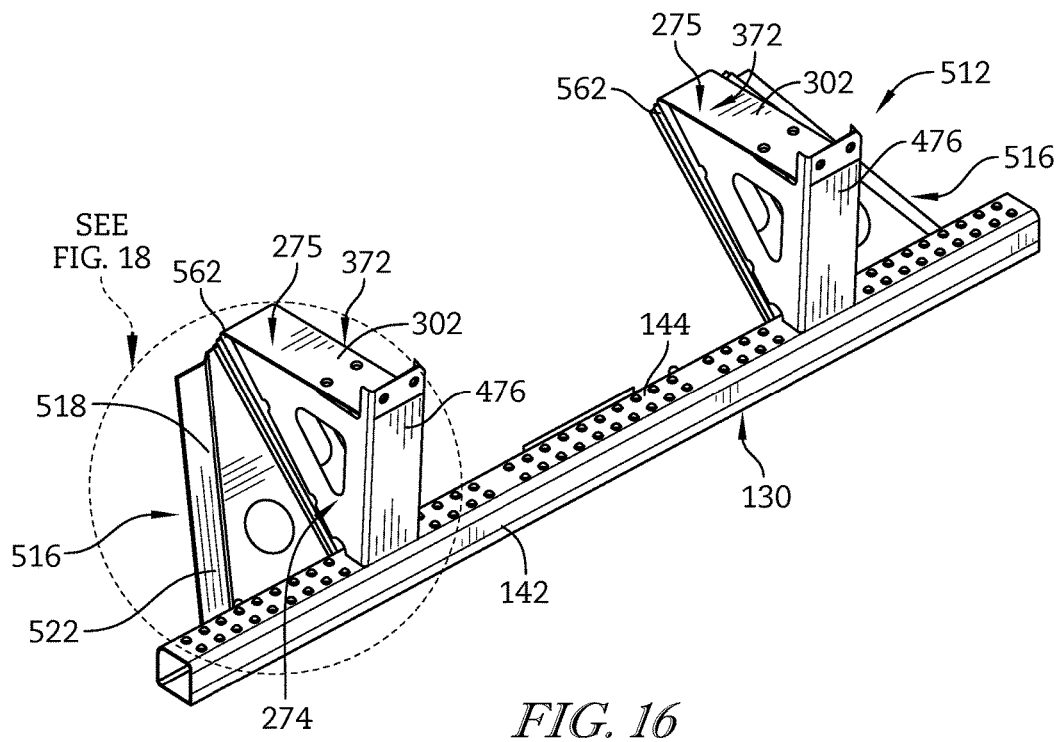
FIG. 16 is a perspective view of an alternative rear impact guard of the present disclosure similar to the rear impact guard shown in FIG. 12 and also including a gusset coupled to each of the bumper support members of FIGS. 8 and 9.
Figure 17:
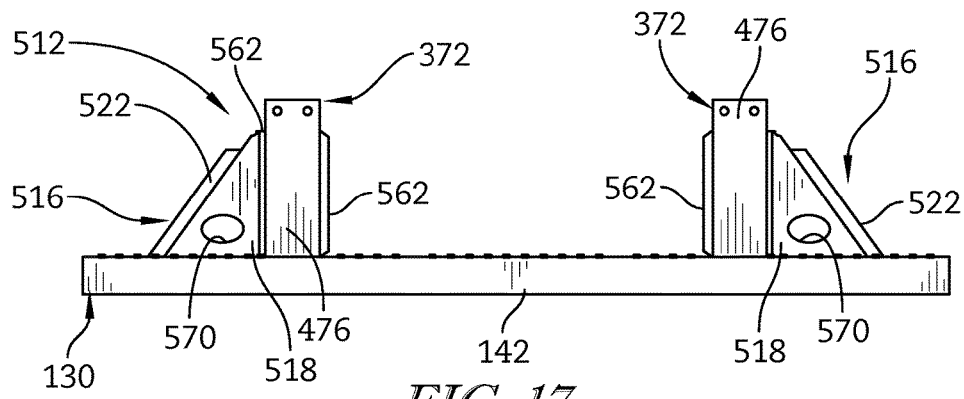
FIG. 17 is a rear view of the rear impact guard of FIG. 16.
Figure 18:
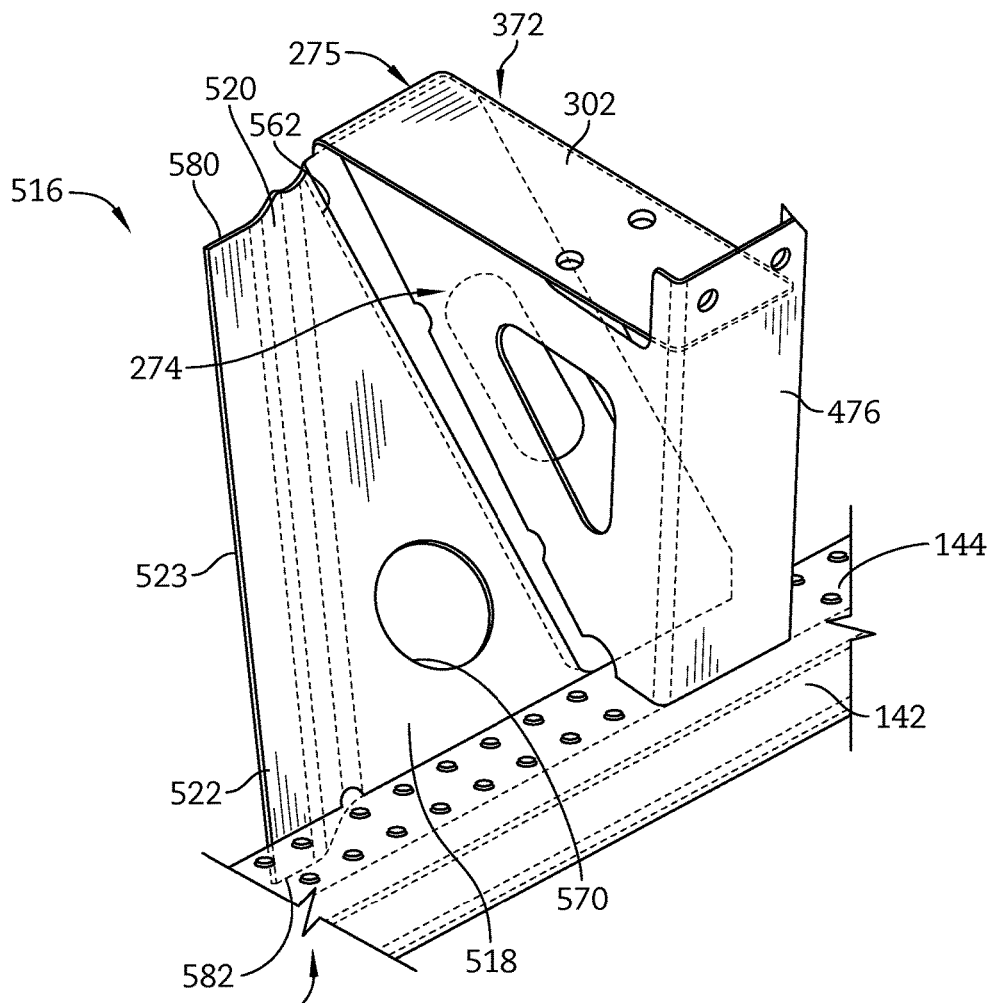
FIG. 18 is a rear perspective view one of the bumper support members of the rear impact guard of FIGS. 16 and 17 with the gusset attached thereto.
Figure 19:
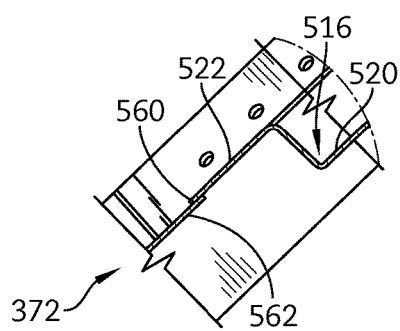
FIG. 19 is a top view of the bumper support member and gusset of FIG. 18.

Illustratively, the bumper support members 272, 372 are each made of two shells 274 and the center member 275 positioned between and coupled to each of the two shells 274. Thus, the bumper support members 272, 372 each include three main components. Further, the bumper support members 70, 72 are each made of two shells 74 thus including two main components. However, as noted above, the bumper support members 70, 72, 272, 372 disclosed herein may be made of any number of suitable components that are bent and/or configured into the shapes shown and described above. For example, as shown in FIGS. 14 and 15, a generally planar first component 400 and a generally planar second component 402 are provided. The first component 400 includes many of the same or similar features of the shells 274 described above such that the first component 400 may be bent or folded along the two fold lines shown in FIG. 14 in order to form a one-piece structure that is equivalent to two shells 274 coupled to each other. In other words, the two shells 274 of the bumper support member 272 may be formed from the single component 400. A single vertical plate 476 between the fold lines 410 of the first component 400 is generally the same size and shape as the portion of the bumper support member 272 formed by coupling the vertical plate 276 of each shell 274 together. Forming the two shells 274 of the single component 400 may provide a stronger vertical bumper support member because the weld seam 220, 320 is eliminated.

The second planar component 402, shown in FIG. 15, may be bent along the fold line 412 in order to form the center member 275 of the bumper support members 272, 372. Bending the second planar component 402 along the fold lines 414 operates to differentiate the central body 303 and the flanges 312 of the lower member 304. Illustratively, the planar components 400, 402 may be bent along the respective fold lines 410, 412 by a progressive die machine or a stamping press, for example. As noted above, it should be understood that while the vertical bumper support members 272, 372 may be configured from the two planar components 400, 402 shown in FIGS. 14 and 15, the vertical bumper support members 272, 372 may also be formed from a single planar component (not shown) that is able to be bent and configured to form the vertical bumper support members 272, 372. Similarly, the vertical bumper support members 70, 72 may be formed from a single planar component (not shown) that is able to be bent and configured to form the vertical bumper support members 70, 72 or bumper support brackets 70, 72.

Illustratively, the vertical bumper support members 70, 72, 272, 372, 970, 974 or brackets 70, 72, 272, 372, 970, 974 disclosed herein are made from advanced high strength steel such as, but not limited to, DOMEX® hot-rolled steel from SSAB Tunnplat in Sweden. In particular, thin steel sheets (i.e., approximately 3 millimeters) of advanced high strength steel are used to fabricate the above described components of the vertical bumper support members or brackets 70, 72, 272, 372, 970, 974. Further, the horizontal bumper 130 may also be made of the same advanced high strength steel. However, it should be understood that each component of the rear impact guards described herein may be made from any suitable material including high strength steel, metals, metal alloys, plastics, and/or composites.

Illustratively, various bumper support members 70, 72, 272, 372, 970, 974 are shown and described herein. As noted herein, each of these bumper support members 70, 72, 272, 372, 970, 974 includes various components which cooperate to define a hollow, generally triangular prism. The hollow prism shape of each bumper support member 70, 72, 272, 372, 970, 974 operates to increase bending and torsional strength of the bumper support member while also minimizing the amount of material used to manufacture each member, thus minimizing weight and material cost of each member. The hollow prism includes first and second generally triangle-shaped faces that are spaced-apart from each other as well as first, second, and third sides that are each positioned between and coupled to the first and second triangle-shaped faces. Illustratively, the side plates 78, 278 of the bumper support members 70, 72, 272, 372 define the first and second spaced-apart generally triangle-shaped faces. The two adjacent vertical plates 76, 276 that are welded together as well as the single vertical plate 476 of the component 400 shown in FIG. 14 define the first side of the prism. The flanges 92 of two shells 74 that are welded together define the second side of the prism while the horizontal member 302 of the center member 275 of the bumper support members 272, 372 define the second side of the prism. The flanges 96 of two shells of the bumper support members 70, 72 that are welded together define the third side of the prism while the lower member 304 of the center member 275 of the bumper support members 272, 372 also define the third side of the prism. The prism is illustratively a right-triangle prism such that the first side and the second side are generally perpendicular to each other.

Figure 21:
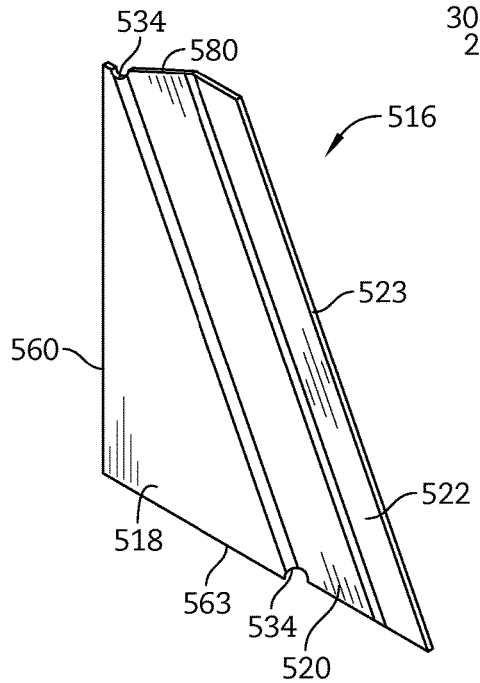
FIG. 21 is a perspective view of one of the gussets of the rear impact guard of FIGS. 17 and 18.
Figure 22:
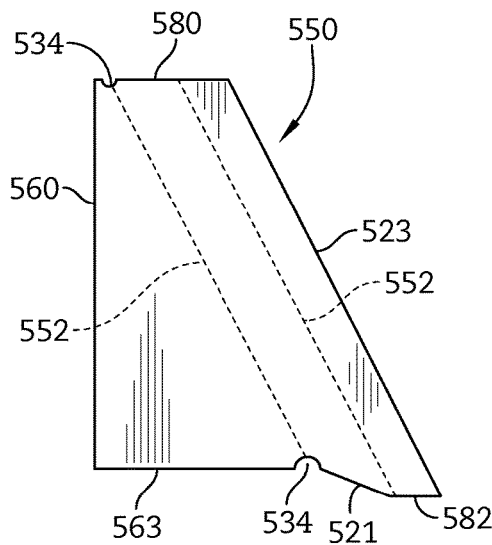
FIG. 22 is a plan view of a flat component to be formed into one of the gussets of the rear impact guard of FIGS. 17 and 18.
Figure 23:
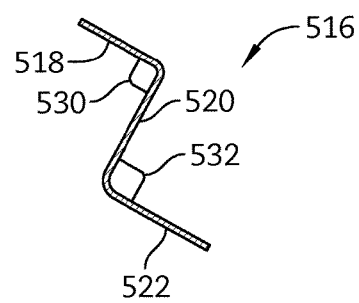
FIG. 23 is a top view of the gusset of FIG. 21.

Looking now to FIGS. 16-20, an alternative rear impact guard 512 is provided. As with the other rear impact guard embodiments disclosed herein, the rear impact guard 512 is configured to be coupled to and depend downwardly from the bottom of the rear frame, such as rear frame 18, and the rear end of a portion of the floor assembly, such as floor assembly 14, of a trailer the same as or similar to the portion of trailer 10 shown in FIG. 1A. The rear impact guard 512 includes a right and left vertical bumper support member 372 that are each the same as or similar to the vertical bumper support member shown in FIG. 13 and made from the first planar component 400 shown in FIG. 14 and the second planar component 402 shown in FIG. 15. As such, like reference numerals are used to denote like components. The rear impact guard 512 further includes a gusset 516 coupled to each of the right and left vertical bumper support members 372. Each gusset 516 is coupled to an outside portion of the lower member 304 of the center member 275 of the respective vertical bumper support member 372. Illustratively, as shown in FIGS. 21-23, each gusset 516 generally defines a Z-shape when viewed from above, as shown in FIG. 23, and includes a triangular wall 518, a middle wall 520 coupled to the triangular wall 518. Illustratively, the triangular wall 518 defines a right-sided triangle. The triangular wall 518 may be solid, as shown in FIGS. 21, 22, 24, and 25, for example, or may include an aperture 570, as shown in FIGS. 16-20, in order to reduce the overall weight of the gusset 516.

The middle wall 520 is coupled to and extends along a hypotenuse edge 523 of the triangular wall 518 and defines a shape similar to a parallelogram whereby the long sides of the middle wall 520 are parallel to each other but the short sides of middle wall 520 are not. In particular, the bottom, short side 521 of the middle wall 520 extends further downwardly below a bottom side of the triangular wall 518. Each gusset 516 further includes an end wall 522 coupled to the middle wall 520 and extending along one side of the middle wall 520. The end wall 522 defines a parallelogram. Illustratively, as shown in FIG. 23, a first angle 530 between the triangular wall 518 and the middle wall 520 is approximately 90 degrees while a second angle 532 between the middle wall 520 and the end wall 522 is similarly approximately 90 degrees. The gusset 516 further includes notches 534 at the top and bottom of the gusset 516 between the triangular wall 518 and the middle wall 520.

The gusset 516 is illustratively formed from a planar component 550 shown in FIG. 22. The planar component 550 is bent or folded along the two, parallel fold lines 552 shown in FIG. 22 in order to form the one-piece gusset 516. Illustratively, the planar component 550 may be bent along the fold lines 552 by a progressive die machine or a stamping press, for example. As shown in FIG. 23 and described above, the planar component 550 is bent along the parallel fold lines 552 to define the 90 degree angles 530, 532 between the triangular wall 518, middle wall 520, and end wall 522 of the gusset 516. Illustratively, as described above, the gusset 516 is a one-piece, or unitary, component. However, the gusset 516 may be formed to include any number of separate components that are coupled together to form or define the gusset 516.

Figure 20:
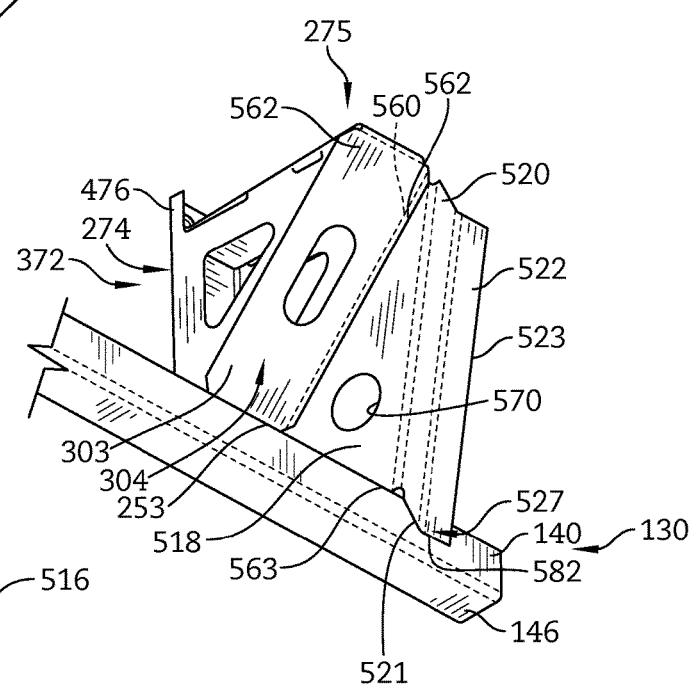
FIG. 20 a front perspective view of the bumper support member and gusset of FIG. 18.

As shown in FIG. 16-20, each gusset 516 of the rear impact guard 512 is coupled to one of the vertical bumper support members 372. Specifically, an outer, vertical edge 560 of the gusset 516 is welded to an outer flange 562 of the center member 275. Illustratively, the outer flanges 562 of the central member 276 are similar to the side flanges 312 of the central member 275 shown in FIG. 11; however, the outer flanges 562 are planar with the central body 303 of the lower member 304 of the center member 275 and are not bent 90 degrees as the side flanges 312 shown in FIG. 11. As such the outer-most outer flange 562 of each vertical bumper support member 372 is coupled to the vertical edge 560 of the gusset 516. As shown best in FIG. 20, a bottom edge 563 of the triangular wall 518 of the gusset 516 is generally aligned with a bottom edge 253 of the center member 275 and is also welded to the front wall 140 of the horizontal bumper 130. The middle wall 520 and end wall 522 of the gusset 516 extend downwardly over the front face 140 of the horizontal bumper 130, as shown in FIG. 20 and are also welded to the front face 140 of the bumper 130. As shown in FIG. 20, the bottom edge 582 of the end wall 522 is positioned approximately mid-way along a height of the front face 140 of the bumper 130. In other words, the bottom edge 582 of the gusset 516 is positioned upwardly of the edge between the front face 140 and the bottom face 146 of the horizontal bumper 130 to form a standard leg 527 of the gusset 516.

Figure 26:
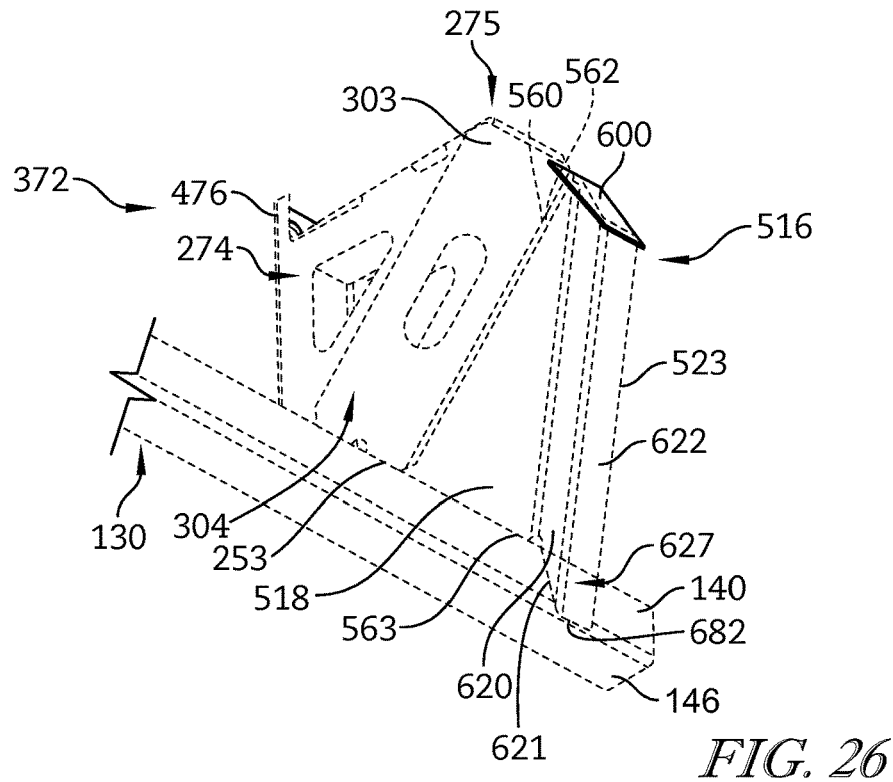
FIG. 26 is a front perspective view of the bumper support member and the gusset attachment of FIGS. 24 and 25 coupled to an alternative gusset.

Alternatively, as shown in FIG. 26, the gusset 516 includes an alternative middle wall 620 and an alternative end wall 622 such that a bottom edge 682 of the outer wall 622 is positioned at the bottom edge of the front face 140 of the horizontal bumper 130. Accordingly, a bottom edge 621 of the middle wall 620 is longer than the bottom edge 521 of the gusset 516 shown in FIG. 20, for example, in order to define an extended leg 627 of the gusset 516. It should be understood that the gusset 516 may be formed and configured such that the bottom edge of the end wall 522 of the gusset 516 is positioned at any height along the front wall 140 of the horizontal bumper 130. Illustratively, the flange 562 of the vertical bumper support member and the edge 560 of the gusset 516 are welded to each other, while the other components of the gusset 516 are welded to the horizontal bumper 130; however, it is within the scope of this disclosure to couple the gusset 516 and vertical bumper support member 372 to each other and to couple the gusset 516 to the bumper 130 using other suitable fasteners such as bolts, rivets, and/or adhesive in lieu of or in addition to one or more welds, for example.

Figure 24:
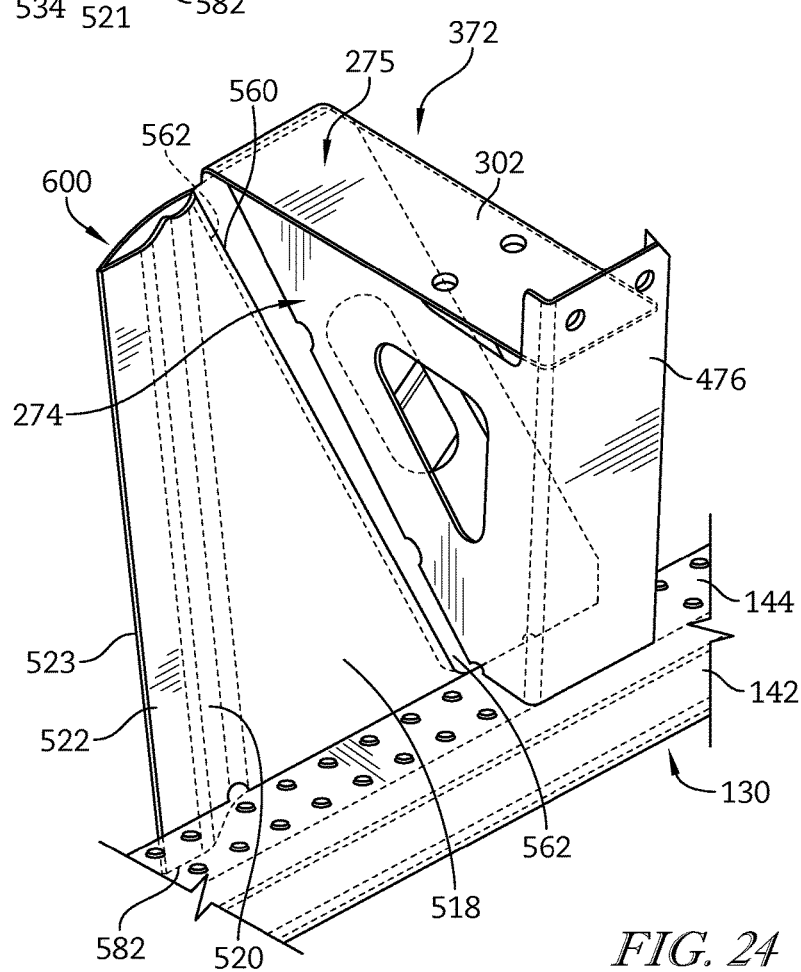
FIG. 24 is a rear perspective view of an alternative bumper support member and gusset further including a gusset attachment coupled to a top portion of the gusset.
Figure 25:
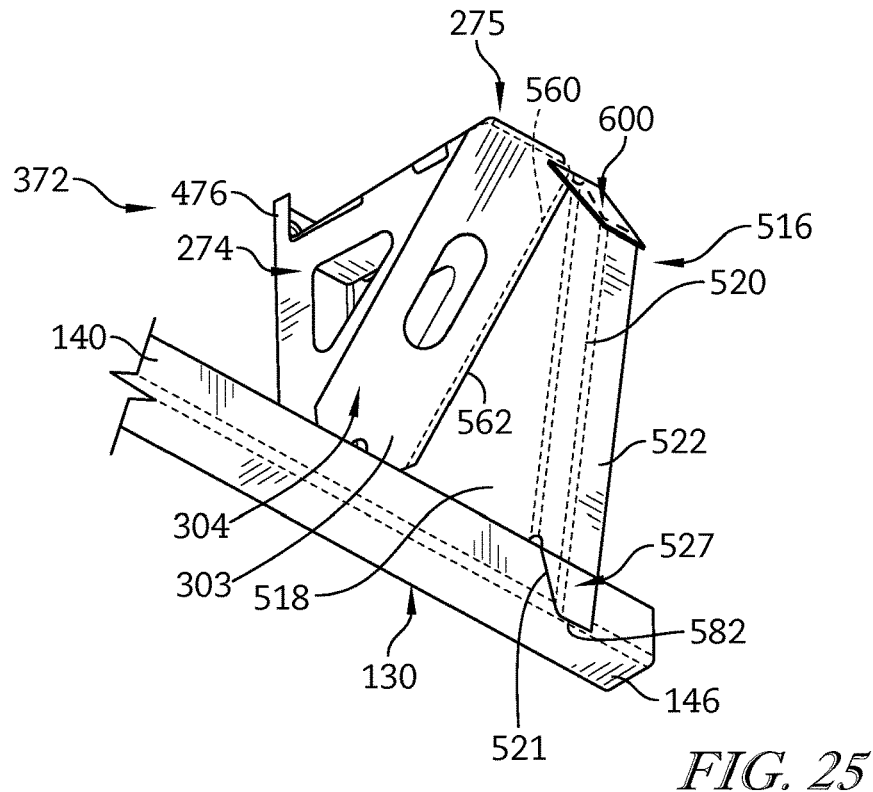
FIG. 25 is a front perspective view of the bumper support member, gusset, and gusset attachment of FIG. 24.
Figure 33:
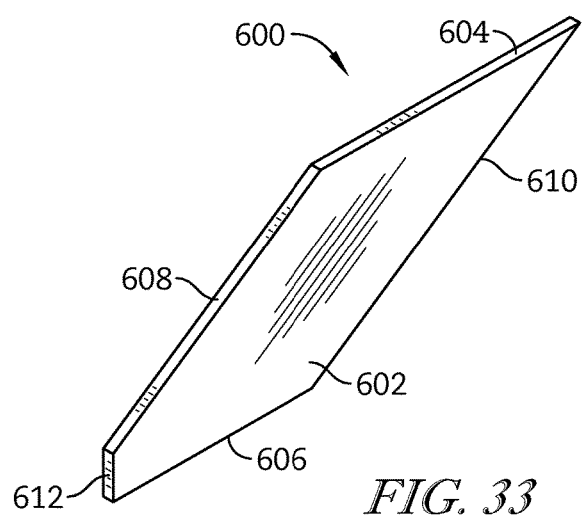
FIG. 33 is a perspective view of the gusset attachment of FIGS. 24-29.

Looking now to FIGS. 24, 25, and 33, a gusset attachment 600 is coupled to the gusset 516 of the rear impact guard 512. In particular, the gusset attachment 600 is coupled to a top edge 580 of the gusset 516 and engages and is coupled to a portion of the center member 275 of the vertical bumper support member 372. A bottom surface 602 of the gusset attachment 600 is welded to the top edge 580 of the gusset 516 in order to generally close the open, Z-shape of the top edge 580 of the gusset 516. Further, an inboard tip of the gusset attachment 600 rests against the planar surface of the central body 303 of the lower, angled member 304 of the vertical bumper support member 372.

Figure 27:
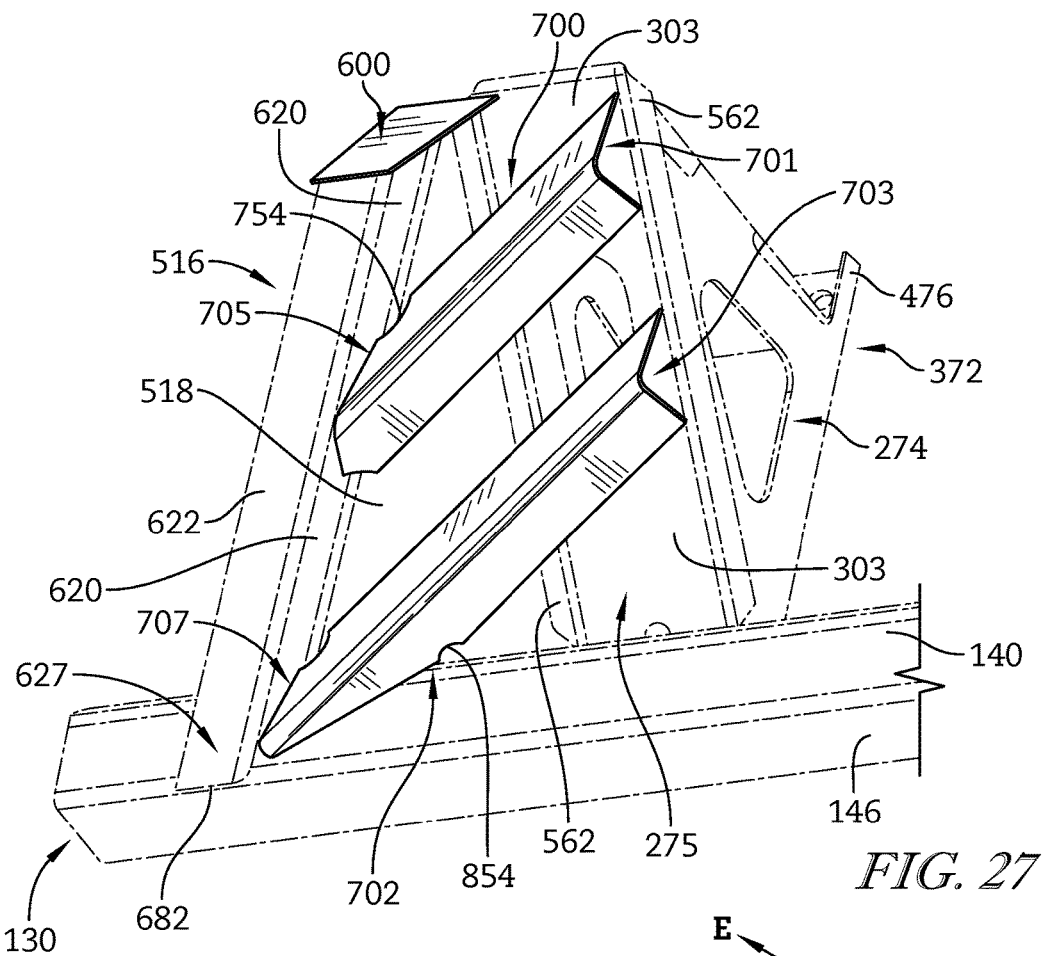
FIG. 27 is a front perspective view of the bumper support member, the alternative gusset, and gusset attachment of FIG. 26, and further including a first and a second cross-brace each coupled at a first end to the gusset and at a second end to the bumper support member.
Figure 28:
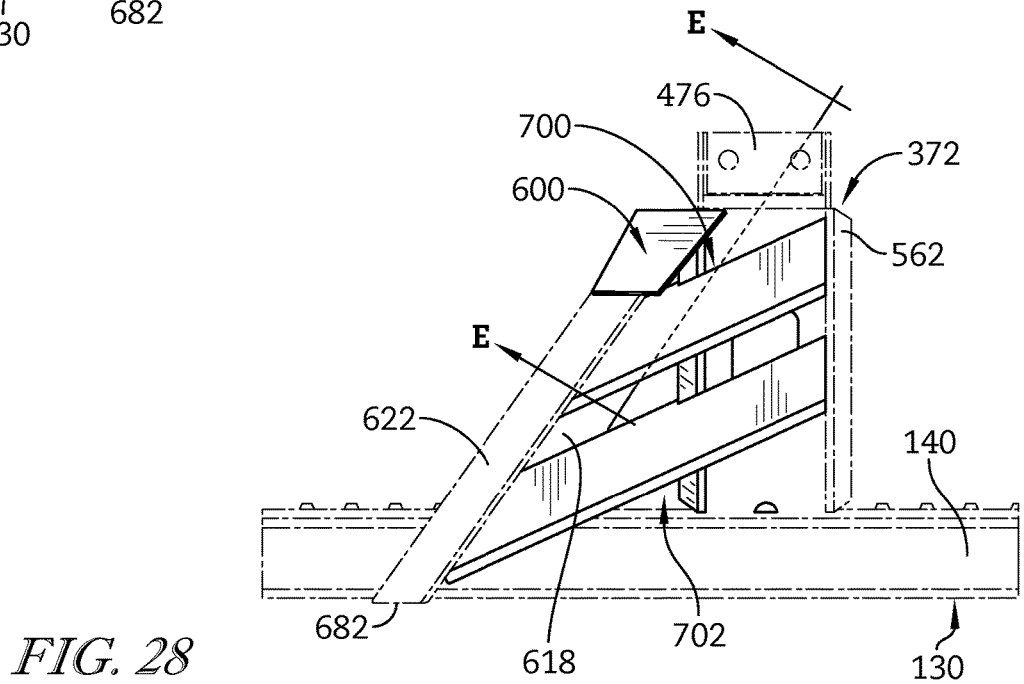
FIG. 28 is a front view of the bumper support member, the alternative gusset, the gusset attachment, and the first and second cross-braces of FIG. 27.
Figure 29:
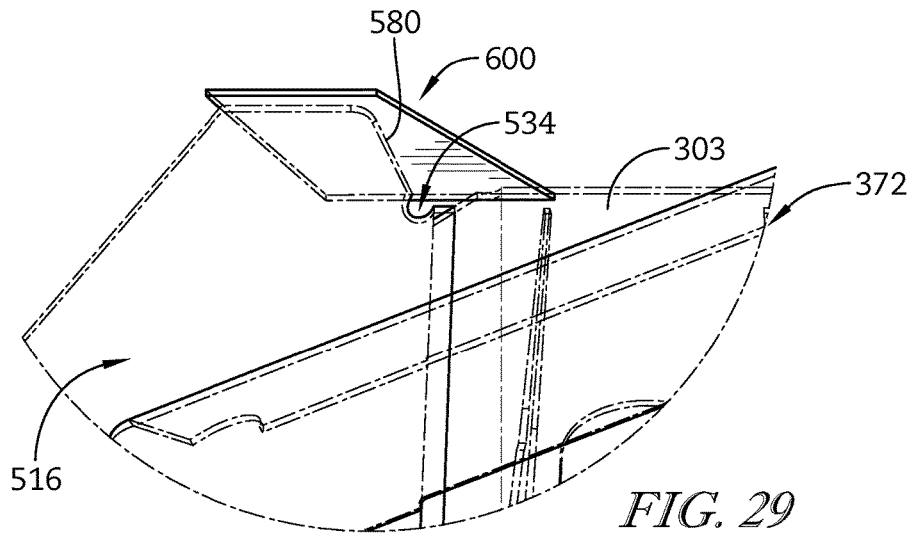
FIG. 29 is a perspective view of the gusset attachment of FIGS. 24-28.

The gusset attachment 600 operates to further strengthen the gusset 516 and vertical bumper support member 372 in the event of an impact by a vehicle, for example. Particularly, the gusset attachment 600 may provide additional torsional strength to the rear impact guard 512. As shown in FIG. 33, the gusset attachment 600 is a planar component defining five sides. Two pairs of opposite sides of the gusset attachment 600 are parallel to each other. In particular, sides 604 and 606 are parallel to each other while sides 608 and 610 are parallel to each other. Side 612 is not parallel to any other side of the gusset attachment 600. Illustratively, the gusset attachment 600 may also define only four sides, as shown in FIGS. 27-29, for example. Illustratively, the rear impact guard 512 may include the gusset attachment 600, or may be provided without the gusset attachment 600.

Figure 30:
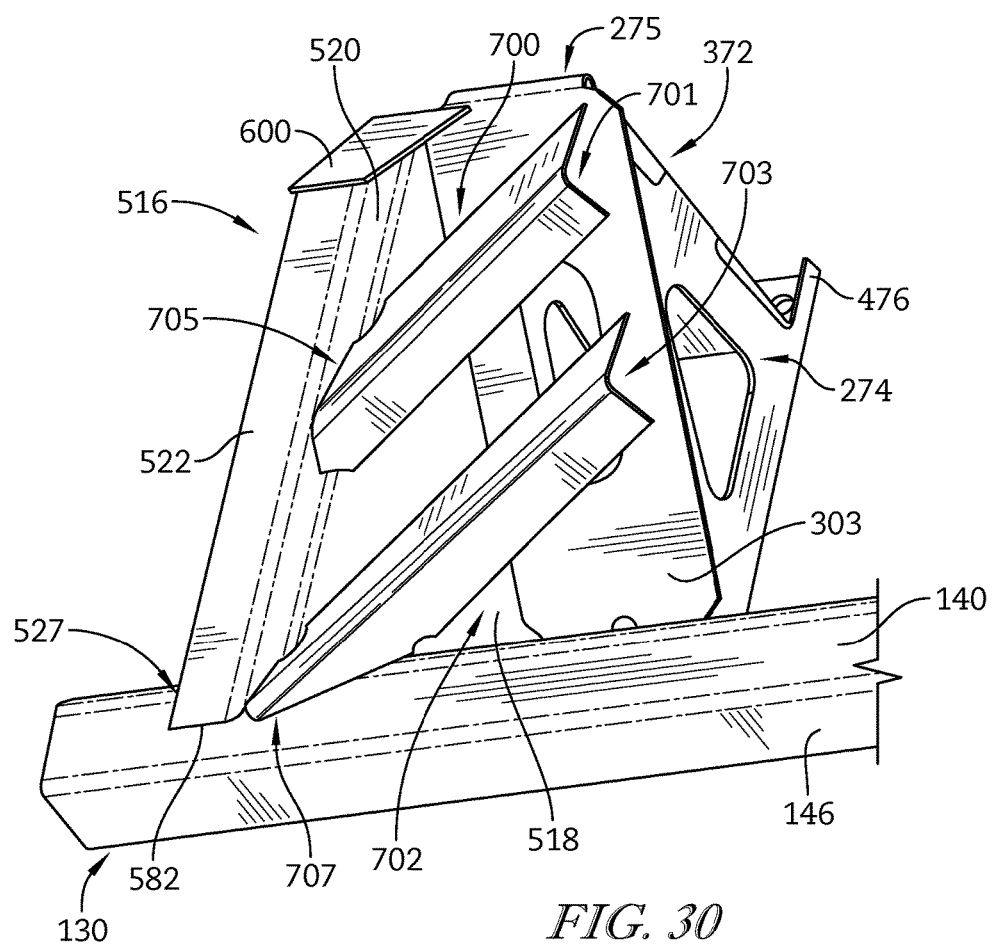
FIG. 30 is a front perspective view similar to FIG. 27 showing the bumper support member, the gusset of FIGS. 18-20, the gusset attachment, and the first and second cross-braces.

Looking now to FIGS. 27-29, a first and second cross-brace 700, 702 of the rear impact guard 512 is used with the vertical bumper support member 372, the gusset 516 (including the standard leg 527 shown in FIG. 30 and the extended leg 627 shown in FIG. 27), the and the gusset attachment 600. The first and second cross-braces 700, 702 are each coupled at a respective first end 701, 703 to the vertical bumper support member 372 and at a respective second end 705, 707 to the gusset 516. In particular, the first end 701, 703 of each of the first and second cross-braces 700, 702 is coupled to the lower member 303 of the center member 275 of the vertical bumper support member 372, and the second end 705, 707 of each of the first and second cross-braces 700, 702 is coupled to the illustrative middle wall 620 of the gusset 516. The first and second cross-braces 700, 702 are welded to each of the gusset 516 and the vertical bumper support member 372, but may be coupled to the gusset 516 and the vertical bumper support member 372 using other suitable fasteners including, but not limited to, rivets, screws, and/or adhesive, for example. The cross-braces 700, 702 operate to further strengthen the rear impact guard 512 against impact forces from another vehicle.

Figure 31:
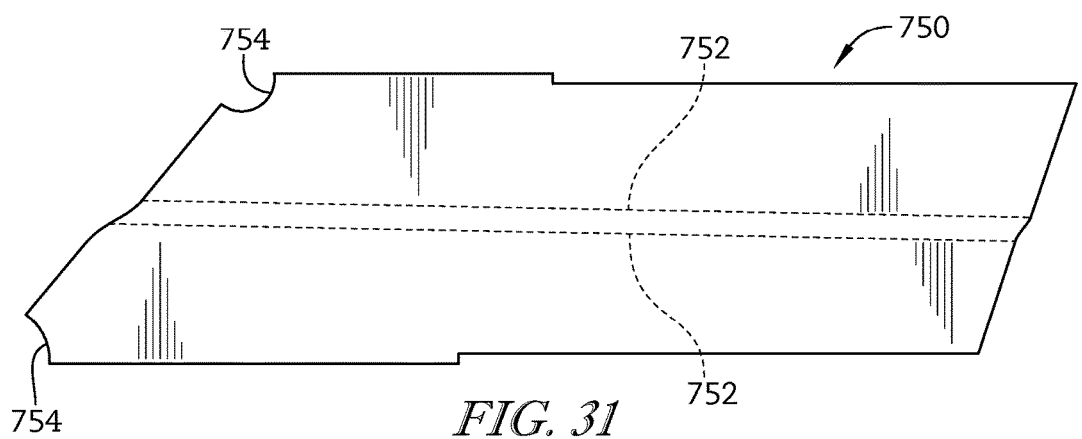
FIG. 31 is a plan view of a flat component to be formed into the first cross-brace of FIGS. 27, 28, and 30.
Figure 32:
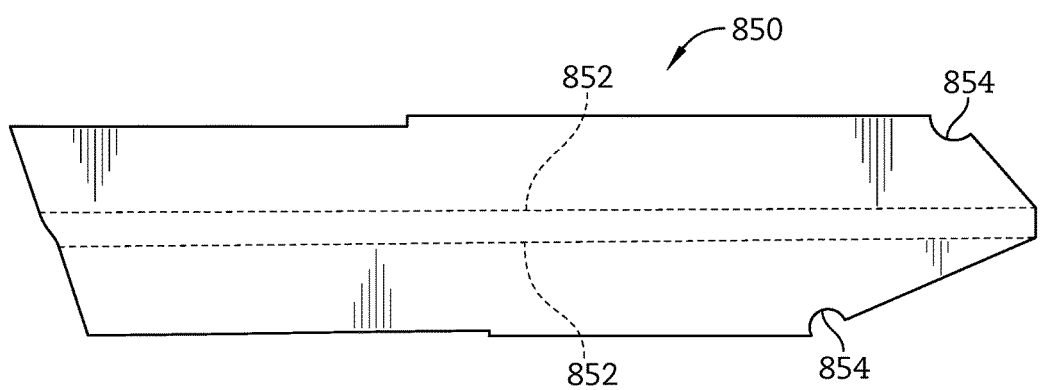
FIG. 32 is a plan view of another flat component to be formed into the second cross-brace of FIGS. 27, 28 and 30.

As shown in FIG. 31, the first cross-brace 700 is illustratively formed from a planar component 750. The planar component 750 is bent, or folded, along the parallel fold lines 752 to form the generally V-shaped first cross-brace 700. The planar component 750 and cross-brace 700 include notches 754 for drainage of any fluids that may accumulate on or around the component. As shown in FIG. 32, the second cross-brace 702 is formed from a planar component 850. The planar component 850 is bent, or folded, along the parallel fold lines 852 to form the generally V-shaped second cross-brace 702. The planar component 850 and cross-brace 702 also include notches 854 for drainage of any fluids. Illustratively, the planar components 750, 850 may be bent along the respective fold lines 752, 852 by a progressive die machine or a stamping press, for example. Illustratively, the cross-braces 700, 702 are each a one-piece, or unitary, components. However, the cross-braces 700, 702 may be formed to include any number of separate components that are coupled together to form or define the cross-braces 700, 702.

Illustratively, the rear impact guard 514 illustratively includes the vertical bumper support member 372 and the gusset 514 (having both the standard and extended legs 527, 627). The rear impact guard 514 may also include the gusset attachment 600, the first cross-brace 700, and/or the second cross-brace 702. In other words, the gusset attachment 600 and cross-braces 700,702 may be used alone or in combination with each other and with the gusset 514 and vertical bumper support member 372. Further, it should be understood that the gusset 514, gusset support 600, and first and second cross-braces 700, 702 shown and discussed in FIGS.

16-33 may each be used, alone or in combination, with any of the vertical bumper support members shown and disclosed herein.

Referring now to FIGS. 34-44, further illustrative rear impact guards 912, 1212 are depicted. Illustratively, each embodiment of truck 10 disclosed herein generally comprises one of the embodiments of rear impact guard 12, 212, 512, 912, 1212 also known as a rear impact guard assembly 12, 212, 512, 912, 1212, a floor assembly 14, and a trailer rear frame or end wall assembly 18, wherein like reference numerals are used to denote like components herein throughout. The rear impact guard assembly, the floor assembly and the rear frame assembly 18 are coupled together illustratively as described herein.

As further described herein, the floor assembly 14 generally comprises a number of generally parallel cross members 38 and a number of generally parallel slide rails 36, with the cross members 38 and slide rails 36 being generally perpendicular to one another as illustrated for example in FIGS. 1A, 1B, 34 and 41-44. Illustratively, the rails 36 and cross members 38 may be connected through any suitable means including using fasteners, or they may be welded together. The floor assembly 14 illustratively may further include an intercostal 47 extending between and generally perpendicular to adjacent cross members 38 to support cross members 38 as seen for example in FIGS. 34 and 43. Each intercostal 47 may be positioned between the upper horizontal flange 42 and lower horizontal flange 44 of each respective cross member 38. The cross members 38 may include end wall 48 to seal off one or both ends of the cross member 38.

Illustratively, an end clip 967 may be coupled together with and extend generally perpendicularly between one or both ends of two or more cross members 38. End clips 967 may be included at both ends of the two or more adjacent cross members 38 (FIGS. 34 and 43) and may be positioned over end wall(s) 48. End clips 967 provide more stiffness for the floor assembly 14 to support the load input from the bumper support members 970, 974, etc. during an impact. The inner portion of the cross members 38 are similarly supported by the intercostals 47. In the illustrative embodiment, end clips 967 are welded to end walls 48.

For example, as illustrated in FIGS. 34 and 41-43, three cross members 38 are connected or coupled together with a pair of spaced apart end clips 967. Outer support bases 960 and inner support bases 961 underlie in perpendicular relationship those three cross members. In addition an intercostal 47 extends between two of the cross members 38 and another intercostal 47 extends between two of the cross members 38.

As seen for example in FIGS. 34 and 41-44, outer support bases 960 and inner support bases 961 may be positioned such that the each support base 960, 961 extends or underlies on or more of the cross members 38. As seen in FIGS. 34, 36, 41 and 42 a pair of spaced apart outer support bases 960 and a pair of spaced apart inner support bases 961 may be used. Support bases 960 and support bases 961 are spaced apart from each other. In FIGS. 43 and 44, a plurality of spaced apart support bases 960 illustratively are used.

Figure 39:
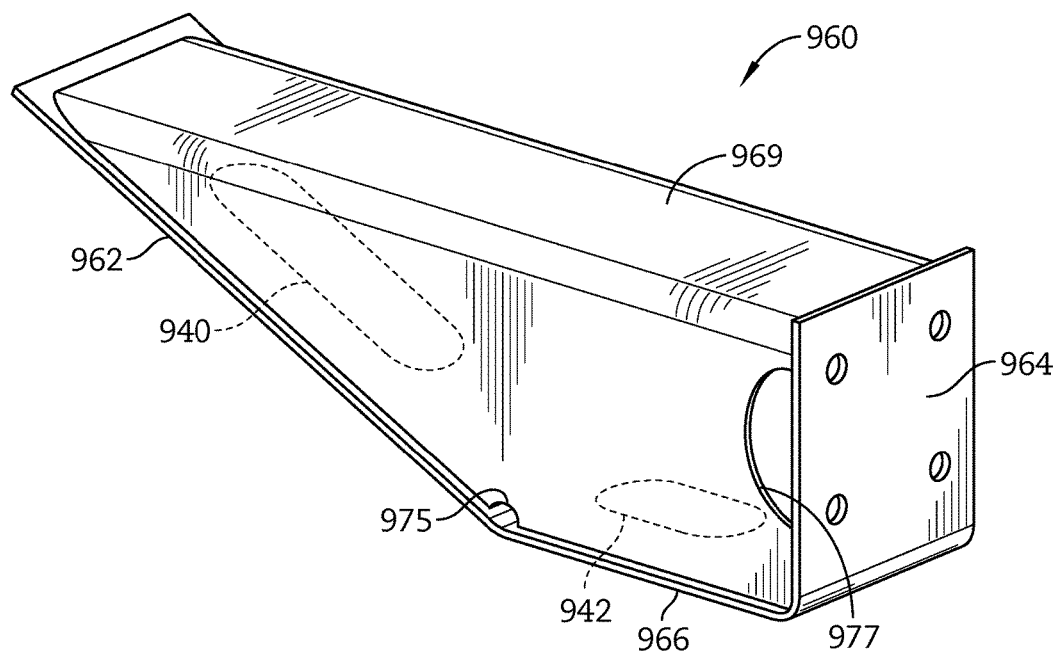
FIG. 39 is a perspective view of the outer support base of FIG. 36.

As seen in FIG. 39, support base 960 generally comprises a continuous member having at one end a generally upstanding front arm 964. The front arm 964 and lower surface 966 are generally perpendicular to one another. Rear arm 962 extends at an angle generally upwardly and away from lower surface 966. Illustratively, front arm 964 includes a plurality of apertures. Rear arm 962 illustratively includes aperture 940. Lower surface 966 illustratively includes aperture 942. A generally upside down U-shaped cover 969 is positioned between front arm 964 and rear arm 962, with the U-shaped opening of cover 969 facing downwardly toward lower surface 966. Cover 969 illustratively includes aperture 977. Cover 969 further includes notch 975.

Figure 40:
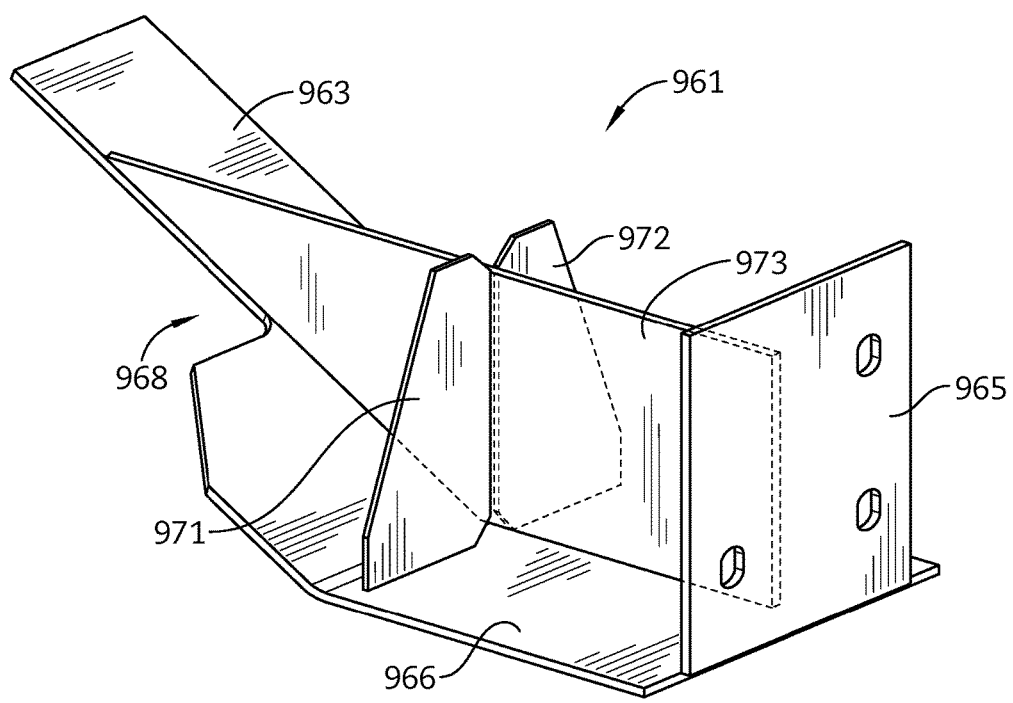
FIG. 40 is a perspective view of the inner support base of FIG. 36.
Figure 41:
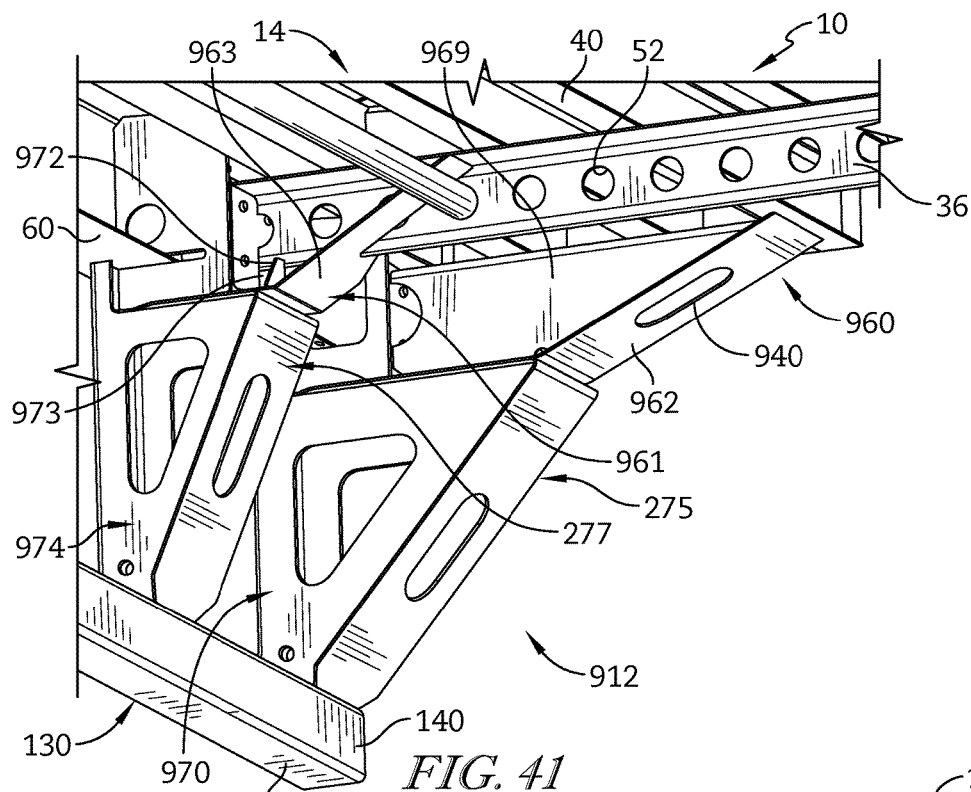
FIG. 41 is a front perspective view of a portion of the rear impact guard of FIG. 34 showing an outer bumper support member including the outer support base and an inner bumper support member including the inner support base of the rear impact guard coupled to the floor assembly.
Figure 42:
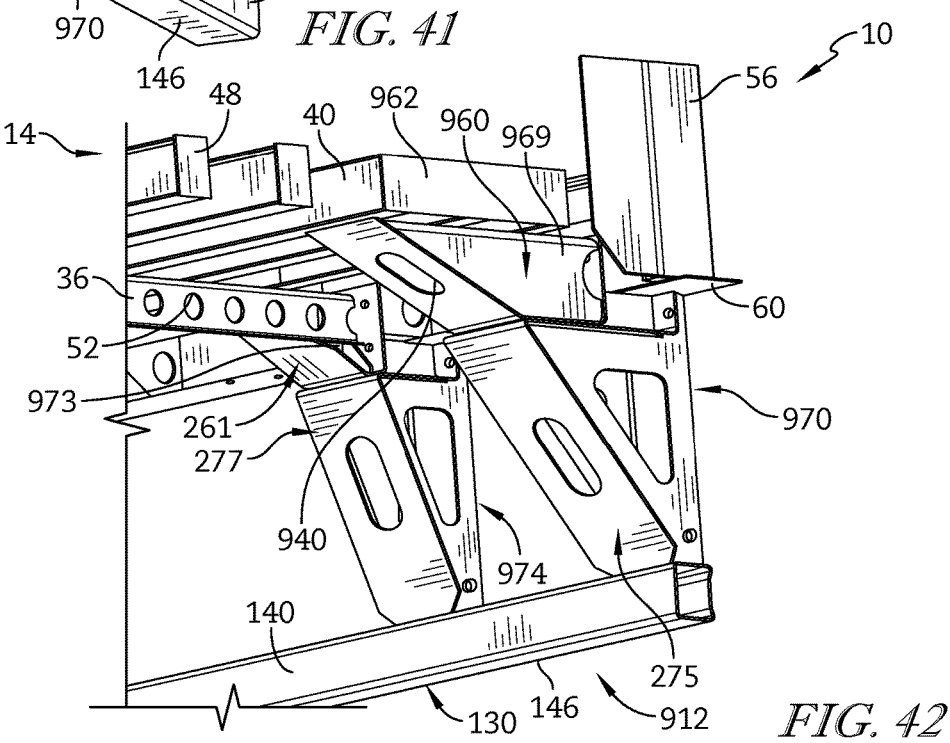
FIG. 42 is another front perspective view of a portion of the rear impact guard of FIG. 34 showing an outer bumper support member including the outer support base and an inner bumper support member including the inner support base of the rear impact guard coupled to the floor assembly.

As best seen in FIG. 40, support base 961 generally comprises a continuous member having at one end a generally upstanding front arm 965. The front arm 965 and lower surface 966 are generally perpendicular to one another. A rear arm 963 extends at an angle generally upwardly and away from lower surface 966. Illustratively, front arm 965 includes a plurality of apertures. Rear arm 963 illustratively includes or defines a cutout 968. Cutout 968 is formed to receive a portion of slide rail 36 as shown in FIGS. 41 and 42. Upright gusset 971 or wall 971 and upright gusset 972 or wall 972 are coupled with lower surface 966 in a generally perpendicular relationship. Illustratively, walls 971, 972 have a generally trapezoidal shape. While not shown in FIG. 40, support base also includes web member 973 as seen in FIG. 41. Illustratively, web member 973 makes a connection with slide rail 36 along the lower edge of the vertical wall of the component. Web member 973 has a generally trapezoidal shape. It is sandwiched in an upright orientation between walls 971, 972. Web member 973 illustratively extends from front arm along lower surface 966, through the gap between upright wall 971 and upright wall 972 and up along rear arm 963. Illustratively, web member 973 has a lower edge that may be attached together, illustratively for example by welding, with lower surface 966. Illustratively, web member 973 has a right upstanding edge that may be attached together, illustratively for example by welding, with front face 965. Upper edge of web member 973 extends from the front face 965, through the gap between walls 971, 972 and intersects rear arm 963 partially up rear arm 963.

Support bases 960, 961 are coupled to trailer rear frame 18 as shown in FIGS. 41 and 42. Illustratively, support bases 960, 961 are coupled to fantail 48. Upstanding front arms 964, 965 of support bases 960, 961 are coupled with trailer rear frame 18. Illustratively, support bases 960, 961 extend away from and are cantilevered from trailer rear frame 18. In some embodiments, support bases 960, 961 are bolted or otherwise fastened with trailer rear frame 18. In other embodiments, support bases 960, 961 are welded with trailer rear frame 18. In some embodiments, support bases 960, 961 are bolted, welded, or otherwise fastened with cross members 38 and or bumper support members 70, 74, 270, 970, 974, etc.

Rear assembly 18, also known as the rear frame 18 or end wall 18, as has been described, may include rear frame 20 or end wall frame 20. Rear assembly 18 may further include elongated horizontal sill 54. Vertical posts 56 may extend upwardly from the opposite ends of sill 54. As noted, in some embodiments, extended posts 56 may replace rear frame 20. Rear assembly 18 may further include an elongated horizontal top member, i.e., rear door header, (not shown). Posts 56 illustratively are connected to respective sidewalls 16 by rivets, but may be connected by any suitable fastener, weld, and/or adhesive. The opposite ends of sill 54 are connected to respective base rails 40 by known welding, but may be connected in any suitable manner. Illustratively, sill 54 includes a fantail 58 and a base plate 60 attached to the underside of the fantail 58.

Illustratively, as shown in FIGS. 34-42, rear impact guard assembly 912, includes horizontal bumper 130 as well as two vertical bumper support members 970 and two vertical bumper support members 974. Each outer vertical bumper support member 970 illustratively is positioned at a location outside the slide rails 36. Each inner vertical bumper support member 974 is positioned inboard of each outer bumper support member 970. Further illustratively, each inner bumper support member 974 is positioned generally under and inboard of respective slide rails 36. Accordingly, the rear impact guard 912 shown in FIG. 34 includes right and left pairs of spaced-apart vertical bumper support members 970, 974 such that the illustrative rear impact guard 912 of FIG. 34 includes four vertical bumper support members 970, 974.

Each pair of vertical bumper support member includes an outermost vertical bumper support member 970 and an innermost vertical bumper support member 974. Illustratively, the outermost vertical bumper support member 970 may provide offset impact protection to vehicles in a rear-impact accident with the trailer 10. FIG. 34 illustrates both pairs of vertical support bumper members 970, 974; however, only one pair of vertical bumper support members 970, 974 are shown in FIGS. 35-36 and 41-42 and described herein. As such, it should be understood that the other pair of vertical bumper support members 970, 974 are identical in structure and function to the described vertical bumpers 970, 974.

It should be understood that while the rear impact guard 912 may include two pairs of vertical bumper support members 970, 974, as shown in FIG. 34, it is within the scope of this disclosure for the rear impact guard 912 to include any suitable number of vertical bumper support members 970 or 974 or pairs of bumper support members 970 and 974 positioned at any suitable location along the length of the horizontal bumper 130. For example, as will be further described, rear impact guard assembly 1212 (FIGS. 43-44) illustratively includes a plurality of vertical bumper support members 970. For example, FIGS. 43-44 illustratively disclose three spaced apart bumper support members 970, which are each illustratively spaced apart from slide rails 36.

Illustratively, each outermost vertical bumper support member 970 is positioned farther outward from a longitudinal centerline of the trailer 10 than each innermost vertical bumper support member 974. In other words, outermost vertical bumper support member(s) 970 is closer to the nearest sidewall 16 of the trailer 10 than innermost vertical bumper support member(s) 974. Such positioning of the inner and outermost vertical bumper support members 970, 974 provides that each may be coupled to different portions of the bottom of the floor assembly 14 of the trailer 10.

Illustratively, vertical bumper support members 970, 974 comprise a generally hollow component including angles, or corners, distributed to the outside of the bumper support members 970, 974 thus providing increased torsional stability of the bumper support members 970, 974 while also minimizing the overall weight of the rear impact guard 912. Reducing the weight of the rear impact guard operates to reduce the overall weight of the trailer thus allowing the operator to either increase the load capacity of the trailer and/or lower the fuel consumption by the tractor-trailer combination.

Illustratively, bumper support member 970, 974 is generally triangular in shape. As noted above for bumper support members 70, 72, 272, 372, bumper support member 970, 974 may be made of any number of suitable components that are bent and/or configured into the shapes shown and described above. Bumper support member 970 includes vertical member 476 or vertical plate 476 sandwiched between and generally perpendicular to spaced apart angle members 288. A center member 275 or angle member 275 may be positioned between or over the spaced apart angle members 288.

Figure 37:
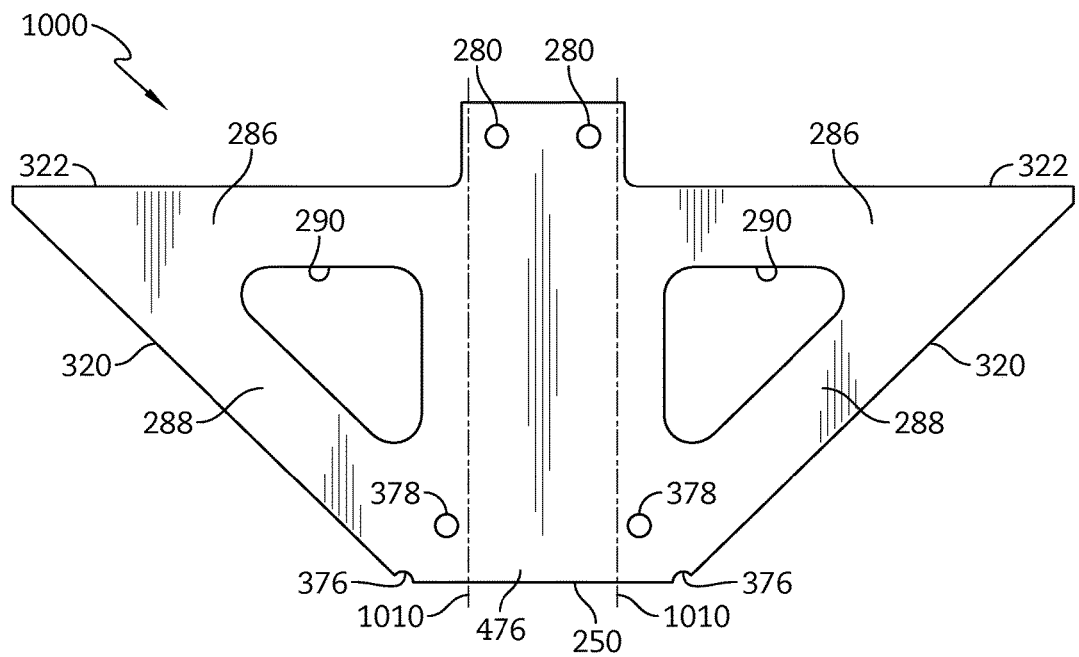
FIG. 37 is a plan view of a first flat component to be formed into a first portion of the outer bumper support member of FIG. 34.

Bumper support member 970 may be formed from planar component 1000, which is illustratively trapezoidal in shape (FIG. 37). Planar member 1000 includes vertical member 476 with angled member 288 extending on either side of vertical member 976. Planar member 1000 may be bent or folded along the two fold lines 1010 shown in FIG. 37 in order to form a one-piece structure. Single vertical plate or member 476 located between the fold lines 1010 is generally the same size and shape as the portion of the bumper support member 272 formed by coupling the vertical plate 276 of each shell 274 together.

While the angle members 288 could be welded or otherwise connected to vertical member 976, forming the shell of bumper support member 970, 974 from single planar component 1000 may provide a stronger vertical bumper support member. Planer component 1000 further includes apertures 378. Each aperture 378 is formed on each side of member 476. Planer component 1000 further includes notches 376 formed along a lower portion of angled member 288.

Figure 38:
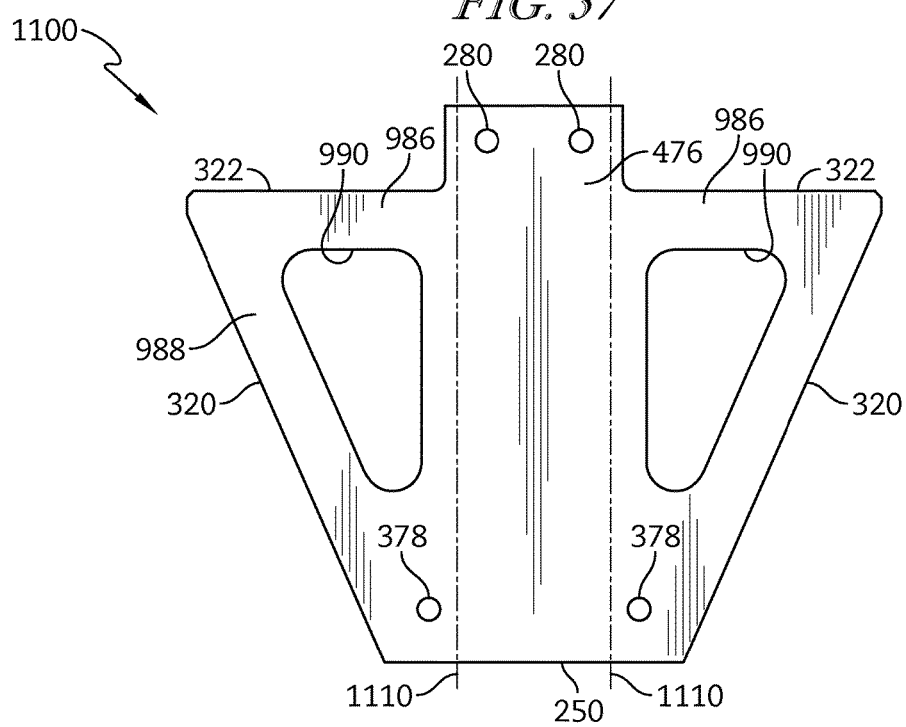
FIG. 38 is a plan view of a first flat component to be formed into a first portion of the inner bumper support member of FIG. 34.

Bumper support member 974 may be formed from planar component 1100, which is illustratively trapezoidal in shape (FIG. 38). Planar member 1100 includes vertical member 476 with angled member 988 extending on either side of vertical member 476. Planar member 1100 may be bent or folded along the two fold lines 1110 shown in FIG. 38 in order to form a one-piece structure. Single vertical plate or member 476 located between the fold lines 1110 is generally the same size and shape as the portion of the bumper support member 272 formed by coupling the vertical plate 276 of each shell 274 together. The planer component 1100 includes an upper horizontal member 986 and an angled member 988. The horizontal member 986 is relatively shorter than horizontal member 286 to cause an angle of the angled member 988 to be smaller than the angle of the angled member 288.

While the angle members 988 could be welded or otherwise connected to vertical member 476, forming the shell of bumper support member 974 from single planar component 1100 may provide a stronger vertical bumper support member. Planer component 1100 further includes apertures 378. Each aperture 378 is formed on each side of member 476. Illustratively, the apertures 378 of bumper support member 974 align with apertures of bumper support members 970. Planer component 1100 further includes apertures 990. Planar components 1000, 1100 may be folded or bent as described by a progressive die machine or a stamping press, for example. As noted above, it should be understood that while the vertical bumper support members 970, 974 may be configured from planar components 1000, 1100 and center member 275, the vertical bumper support members 970, 974 may also be formed from a single planar component (not shown) that is able to be bent and configured to form the vertical bumper support members 970, 974.

A rear impact guard 1212 is shown in FIGS. 43 and 44. Rear impact guard 1212 includes three bumper support members 970 and three support bases 960. The three bumper support members 970 are spaced apart about equidistant from one another. One of the bumper support members 970 is located about midway along horizontal bumper 130. Rear impact guard 1212 further includes center member 277. Center member 277 is substantially similar to center member 275. However, an upper member 305 of center member 277 is relatively shorter than upper member 302 of center member 275.

In the illustrative embodiment, bumper support members 70, 74, 270, 272, 372, 970, 974, etc. and horizontal bumper 30 comprise high strength steel. Illustratively, The floor assembly 14 and the support bases 960, 961 comprise 50K or 80K steel. In other embodiments, any number of components may comprise high strength steel or any other suitable material.

The floor assembly 14 is bolted or fastened to the rear frame 18 in the illustrative embodiment. Illustratively, rear impact guard 912, 1212 are bolted or fastened to the rear frame 18. The rear impact guard 912, 1212 and the floor assembly are not directly connected, in the illustrative embodiment, but the support bases 960, 961 transmit loads when the rear impact guard 912, 1212, etc. apply a force to the support bases 960, 961, for example, during an impact event. In some embodiments, the bumper support members 70, 72, 970, 974, etc. are spaced apart so that a car cannot collide with the rear impact guard 12, 912, 1212, etc. without colliding with at least one bumper support member 70, 72, 970, 974, etc. In some embodiments, the bumper support members 70, 72, 970, 974, etc. are positioned about three inches inward from the widest portion of the trailer 10.

Vertical bumper support member 970, as shown in FIGS. 34-36 and 42-44, may be welded, bolted, or otherwise fastened with bumper 130 and rear frame 18. The rear frame assembly 18 includes the rear frame 20 which forms a rectangular opening into which the rear door or doors (not shown) are provided. As noted above, the rear impact guard 12, 912, 1212, etc. may be coupled to the rear end wall and underside of the floor assembly 14 of the trailer 10. In particular, the rear impact guard 12, 912, 1212 may be coupled to the base plate 60 of the rear sill 54 and to the slide rails 36 of the trailer 10.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

We claim:

1. A rear impact guard configured to be coupled to a rear end of a vehicle, the rear impact guard comprising:
   first and second bumper support members, the first and second bumper support members being identical to one another, the first bumper support member configured to be coupled to a rear end of a vehicle to a first side of a longitudinal axis of the vehicle, and the second bumper support member configured to be coupled to the rear end of the vehicle to a second side of the longitudinal axis of the vehicle;
   third and fourth bumper support members configured to be coupled to the rear end of the vehicle, the third and fourth bumper support members being identical and different from the first and second bumper support members, the third bumper support member being spaced outwardly from the first bumper support member, and the fourth bumper support member being spaced outwardly from the second bumper support member;
   a horizontal bumper mounted at a lower end of each of the first, second, third, and fourth bumper support members;
   wherein each of the third and fourth bumper support members includes a generally triangular prism member.

2. The rear impact guard of claim 1, wherein each of the generally triangular prism members of the third and fourth bumper support members includes a generally triangular-shaped face, a vertical member, a horizontal member, and an angled member, and wherein the vertical, horizontal, and angled members are coupled to outer edges of the triangular-shaped face.

3. The rear impact guard of claim 2, wherein each of the first and second bumper support members includes a general triangular prism member that includes a generally triangular-shaped face, a vertical member, a horizontal member, and an angled member, and wherein the vertical, horizontal, and angled members are coupled to outer edges of the triangular-shaped face.

4. The rear impact guard of claim 2, further including first and second support bases configured to be coupled to the rear end of the vehicle and configured to be positioned below a floor assembly of the vehicle, wherein the first and second support bases are spaced from one another along a width of the vehicle and associated with the third and fourth bumper support members.

5. The rear impact guard of claim 4, further including third and fourth support bases configured to be coupled to the rear end of the vehicle and configured to be positioned below a floor assembly of the vehicle, wherein the third and fourth support bases are spaced from one another along a width of the vehicle and associated with the first and second bumper support members.

6. The rear impact guard of claim 1, wherein the third and fourth support bases are coupled to opposing ends of the horizontal bumper.

7. The rear impact guard of claim 6, wherein the first, second, third, and fourth support members are coupled to at least a top surface of the horizontal bumper.

8. The rear impact guard of claim 7, wherein at least one of the first, second, third, and fourth support members is additionally coupled to a front surface of the horizontal bumper, the front surface defined as a surface facing a direction of travel of the vehicle.

9. The rear impact guard of claim 1, wherein the first and second bumper support members are the same and have a first configuration, the third and third fourth support members are the same and have a second configuration, and the first configuration is different than the second configuration.

10. The rear impact guard of claim 9, wherein:
    the first configuration includes the first and second bumper support members having a first length parallel to a longitudinal axis of the vehicle;
    the second configuration includes the third and fourth bumper support members having a second length parallel to the longitudinal axis of the vehicle; and
    the second length is greater than the first length.

11. The rear impact guard of claim 1, further comprising:
    first and second support bases configured to be coupled to the rear end of the vehicle and configured to be positioned below a floor assembly of the vehicle, wherein the first and second support bases are spaced from one another along a width of the vehicle and associated with the third and fourth bumper support members.

12. The rear impact guard of claim 11, further comprising:
    Third and fourth support bases configured to be coupled to the rear end of the vehicle and configured to be positioned below a floor assembly of the vehicle, wherein the third and fourth support bases are spaced from one another along a width of the vehicle and associated with the first and second bumper support members.

13. The rear impact guard of claim 1, wherein the first, second, third, and fourth bumper support members are coupled to at least a top surface of the horizontal bumper.

14. The rear impact guard of claim 13, wherein at least one of the first, second, third, and fourth bumper support members is additionally coupled to a front surface of the horizontal bumper, the front surface defined as a surface facing a direction of travel of the vehicle.

\* \* \* \* \*